United States Patent
Bergh et al.

(10) Patent No.: US 10,768,501 B2
(45) Date of Patent: Sep. 8, 2020

(54) TILED ELECTROCHROMIC DEVICES ON CARRIER GLASS AND METHODS OF MAKING THE SAME

(71) Applicant: Kinestral Technologies, Inc., South San Francisco, CA (US)

(72) Inventors: Sam Bergh, South San Francisco, CA (US); Howard Turner, South San Francisco, CA (US); Gregg Higashi, South San Francisco, CA (US); Paul Nagel, South San Francisco, CA (US); Wally Barnum, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 140 days.

(21) Appl. No.: 16/024,460

(22) Filed: Jun. 29, 2018

(65) Prior Publication Data

US 2019/0004386 A1  Jan. 3, 2019

Related U.S. Application Data

(60) Provisional application No. 62/526,849, filed on Jun. 29, 2017.

(51) Int. Cl.
| | | |
|---|---|---|
| *G02F 1/153* | (2006.01) | |
| *G02F 1/155* | (2006.01) | |
| *G02F 1/163* | (2006.01) | |
| *G02F 1/1523* | (2019.01) | |
| *G06F 3/14* | (2006.01) | |
| *G02F 1/161* | (2006.01) | |
| *G02F 1/1333* | (2006.01) | |

(52) U.S. Cl.
CPC ............ *G02F 1/1533* (2013.01); *G02F 1/155* (2013.01); *G02F 1/1525* (2013.01); *G02F 1/163* (2013.01); *G02F 1/13336* (2013.01); *G02F 1/161* (2013.01); *G06F 3/1446* (2013.01)

(58) Field of Classification Search
CPC ........ G02F 1/153; G02F 1/155; G02F 1/1533; G02F 1/163; G02F 1/15
See application file for complete search history.

(56) References Cited

U.S. PATENT DOCUMENTS

| | | | | |
|---|---|---|---|---|
| 6,373,618 | B1* | 4/2002 | Agrawal | G02F 1/1503 |
| | | | | 359/265 |
| 7,190,504 | B2* | 3/2007 | Sugiyama | G02F 1/133555 |
| | | | | 349/104 |
| 8,169,684 | B2* | 5/2012 | Bugno | B60R 1/088 |
| | | | | 359/265 |
| 8,717,658 | B2* | 5/2014 | Bergh | G02F 1/155 |
| | | | | 359/275 |
| 9,341,912 | B2* | 5/2016 | Shrivastava | G02F 1/153 |
| 10,301,871 | B2* | 5/2019 | Shrivastava | G02F 1/153 |

(Continued)

*Primary Examiner* — Christopher Stanford
(74) *Attorney, Agent, or Firm* — Womble Bond Dickinson (US) LLP

(57) ABSTRACT

A tiled electrochromic (EC) device comprises a carrier glass, a first EC panel laminated to the carrier glass, a second EC panel laminated to the carrier glass, and a seam between the first EC panel and second EC panel. The first and second EC panels comprise an active area, a clear state and a dark state, and the tiled EC device is capable of switching between a clear state and a dark state.

19 Claims, 13 Drawing Sheets

(56) References Cited

U.S. PATENT DOCUMENTS

| | | | |
|---|---|---|---|
| 2003/0137713 A1* | 7/2003 | Lomprey | C09K 9/02 359/265 |
| 2003/0227663 A1* | 12/2003 | Agrawal | B32B 17/10036 359/265 |
| 2009/0323160 A1* | 12/2009 | Egerton | G02F 1/0147 359/275 |
| 2011/0211246 A1* | 9/2011 | Agrawal | G02F 1/161 359/267 |
| 2014/0177028 A1* | 6/2014 | Shrivastava | G02F 1/153 359/275 |
| 2016/0202588 A1* | 7/2016 | Bass | G02F 1/155 359/265 |
| 2016/0251894 A1* | 9/2016 | Shrivastava | G02F 1/153 359/275 |
| 2017/0130523 A1* | 5/2017 | Shrivastava | G02F 1/153 |
| 2017/0144927 A1* | 5/2017 | Caillet | C03C 17/36 |
| 2018/0201830 A1* | 7/2018 | Higuchi | C08G 79/00 |
| 2019/0169926 A1* | 6/2019 | Shrivastava | G02F 1/153 |
| 2019/0242184 A1* | 8/2019 | Shrivastava | B23K 26/359 |

\* cited by examiner

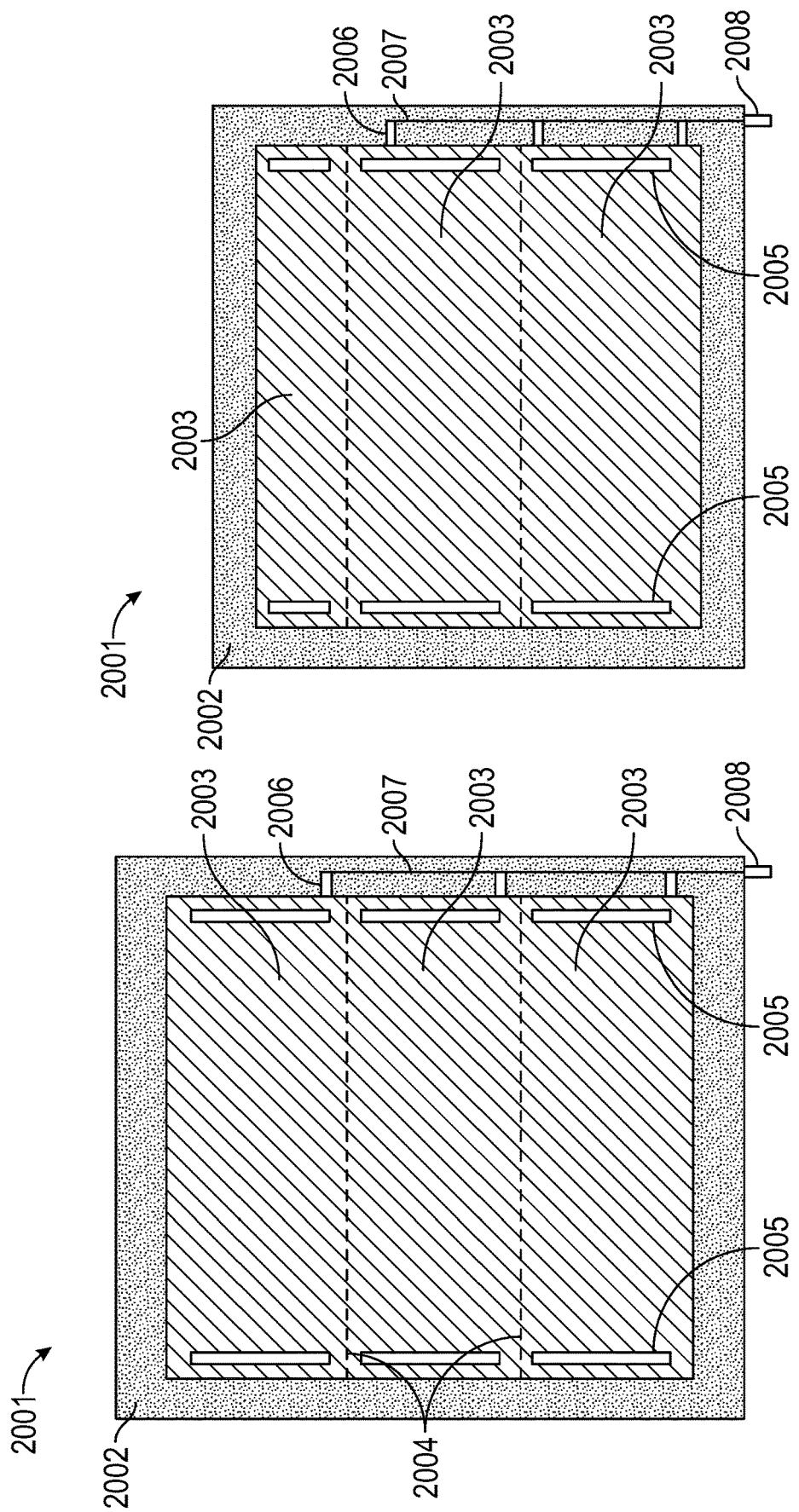

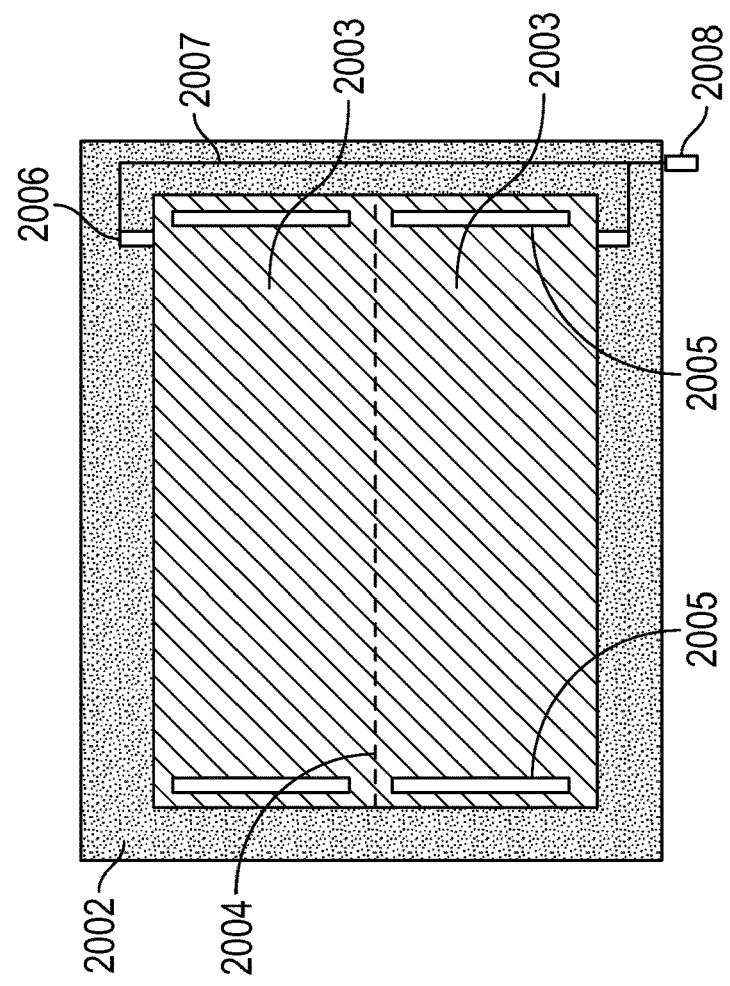
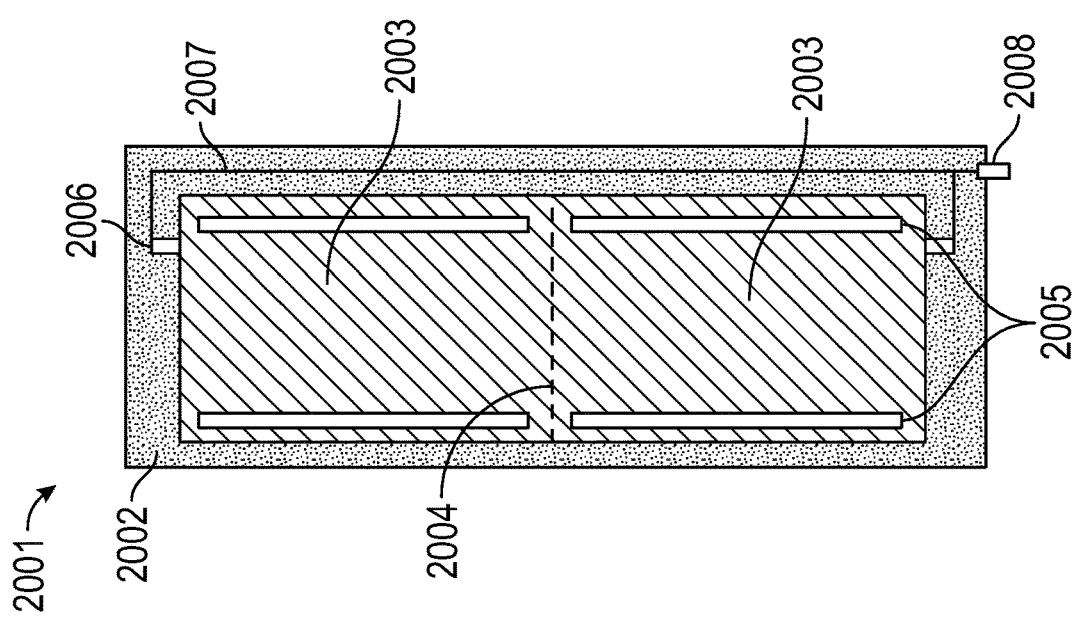
FIG. 10
FIG. 11

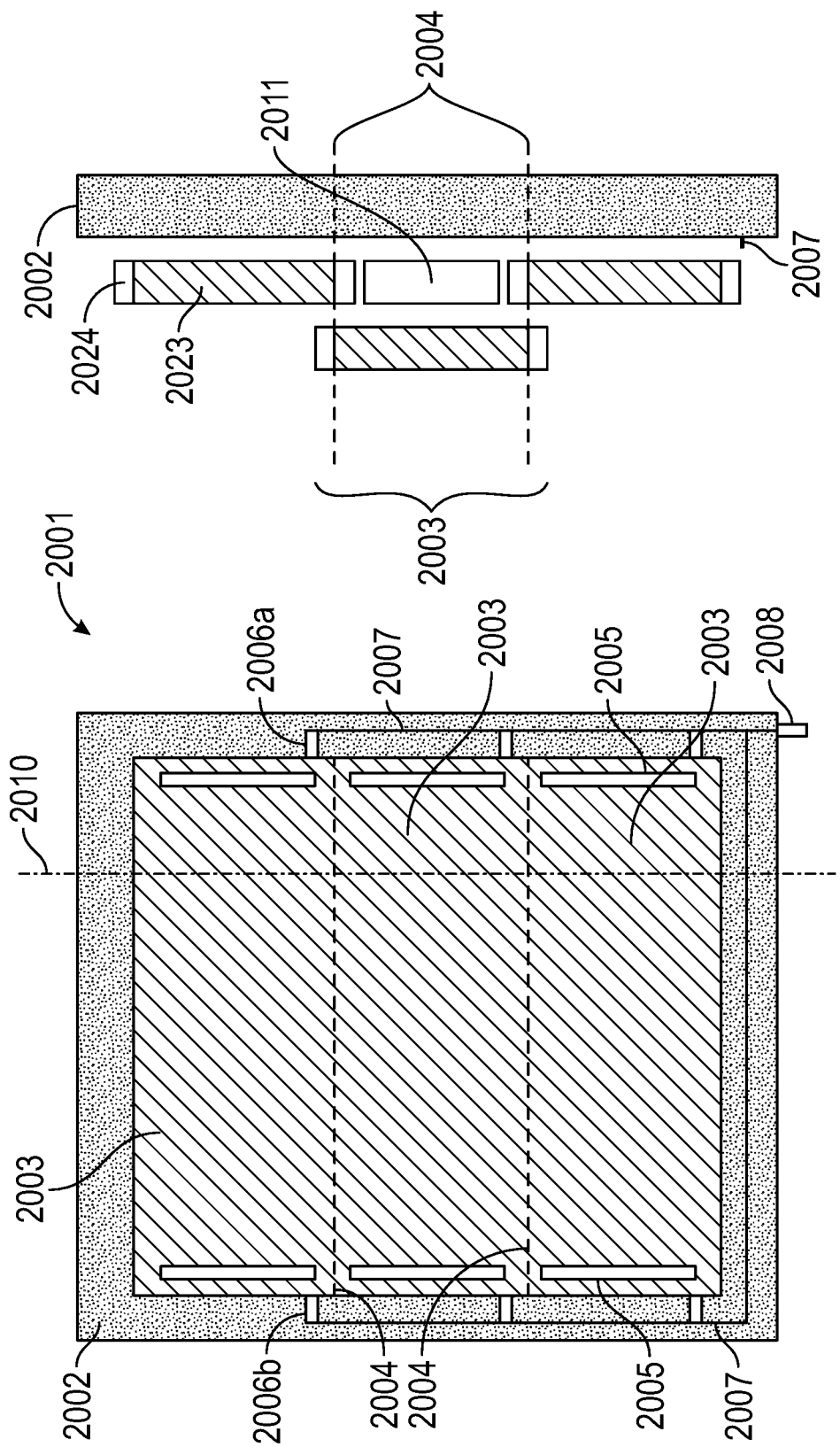

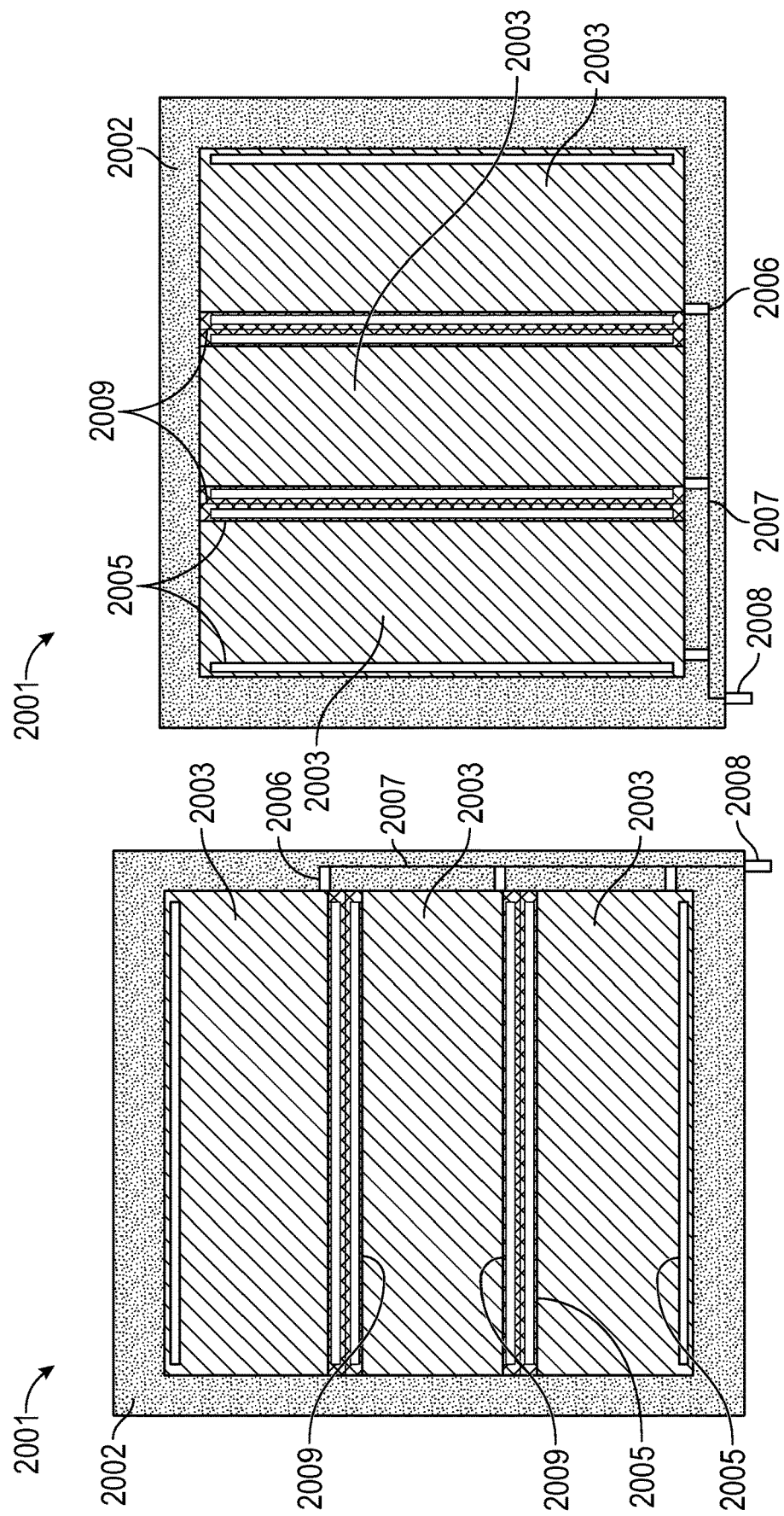

TILED ELECTROCHROMIC DEVICES ON CARRIER GLASS AND METHODS OF MAKING THE SAME

FIELD OF THE INVENTION

The present invention generally relates to switchable electrochromic (EC) devices and panels, such as architectural windows or glazings. More particularly, and in one embodiment, the present invention is directed to multiple switchable EC devices arranged onto a carrier substrate to form a single large area tiled EC device with seams between the individual devices. At least one state of the switchable EC devices is transparent or translucent (or having at least one clear state).

BACKGROUND

Some electrochromic devices are devices that change color state when an electrical current is applied and can switch back and forth between those different color states. Once an electrochromic device has been switched into a state it can remain in that state even after any applied electrical current or voltage is removed. The change in color state may be between different colors, including switching between a mirror state or a transparent state or a translucent state. Electrochromic devices can be capable of being tinted from a low transparency state to many different intermediate translucent (or semi-transparent) states to high transparency states. Historically this technology has been difficult to scale to large size window glass for architectural or transportation usage. In part, this is because in larger scale electrochromic devices an "iris" effect is pronounced, where the device changes color more quickly towards the outside edge and more slowly towards the center of the device. This can be unappealing for use in buildings, or in transportation vehicles using larger substrates such as automotive window, buses, trains, or boats. Additionally, larger scale electrochromic devices can have slow switching speeds when transitioning between states.

Electrochromic devices can be laminated to carrier glass, for various purposes including streamlining the manufacturing process, improving the strength of the device, and packaging the device into an insulated glass unit (IGU). For example, U.S. Pat. No. 7,710,671 describes methods of producing electrically tintable thin film devices including providing a large format glass substrate, fabricating electrically tintable thin film devices on the large format glass substrate, cutting the large format glass substrate into a plurality of electrically tintable pieces, each electrically tintable piece including one of the plurality of electrically tintable thin film devices, providing a plurality of window glass pieces, matching each one of the plurality of electrically tintable pieces with a corresponding one of the plurality of window glass pieces, and laminating each of the matched electrically tintable pieces and window glass pieces. By way of further example, US 2011/0261429A1 describes electrochromic device laminate fabrication processes including fabricating electrochromic devices on substrate daughter panes, cutting each of the electrochromic devices into individual electrochromic devices, and laminating each of the individual electrochromic devices to a separate outer laminate glass panes.

Tiling devices by arranging multiple devices on a single substrate has been described for different types of display technologies where the devices do not have a clear state and are not designed for use as a window. Some of the tiled displays employ strategies to create a single device with invisible seams by hiding the inactive areas by overlapping adjacent tiles, or spacing the tiles close enough together that the pixel pitch does not vary across a seam between the tiles. For example, US20070001927A1 describes a tiled display, including display elements containing bistable materials that can include electrochemical materials, electrophoretic materials, electrochromic materials, magnetic materials, and chiral nematic liquid crystal materials, that are covered by a single protective layer. US20070001927A1 also includes the feature of the individual display elements overlapping to hide inactive areas, and create a continuous display area over multiple display elements. Additionally, U.S. Pat. No. 6,370,019 describes a tiled display with no visible seams between the tiles enabled by the spacing between the pixels separated by the tile seam being the same as the spacing of pixels on the tile. U.S. Ser. No. 09/250,329 also includes the possibility that a backpanel may be provided for the physical mounting and interconnection of the tiles to form a display. While these types of strategies are acceptable for displays, they typically are not applicable to the seams of tiled transparent devices, such as tiled electrochromic devices designed for use as windows.

BRIEF DESCRIPTION OF THE DRAWINGS

To facilitate further description of the embodiments, the following drawings are provided in which: To facilitate further description of the embodiments, the following drawings are provided in which:

FIG. 8 is a top-down view of a tiled electrochromic device containing three electrochromic devices and two seams.

FIG. 9 is a top-down view of a tiled electrochromic device containing three electrochromic panels and two seams, where the three electrochromic panels are not all the same size and shape.

FIG. 10 is a top-down view of a tiled electrochromic device containing two rectangular electrochromic panels and one seam, where the bus bars are located along the longer side of the rectangular panels.

FIG. 11 is a top-down view of a tiled electrochromic device containing two rectangular electrochromic panels and one seam, where the connector leads exit the electrochromic panels along the edge of the device that is adjacent to the edge of the device where the bus bars are located.

FIG. 15A is a top-down view of a tiled electrochromic device containing three electrochromic panels and two seams.

FIG. 15B is a side view of the tiled electrochromic device of FIG. 15A, showing overlapped electrochromic panels within the tiled electrochromic device with adjacent active areas.

FIG. 16 is a top-down view of a tiled electrochromic device containing three electrochromic panels, with horizontally oriented coverings over some of the seams.

FIG. 17 is a top-down view of a tiled electrochromic device containing three electrochromic panels, with vertically oriented coverings over some of the seams.

Figure 1:
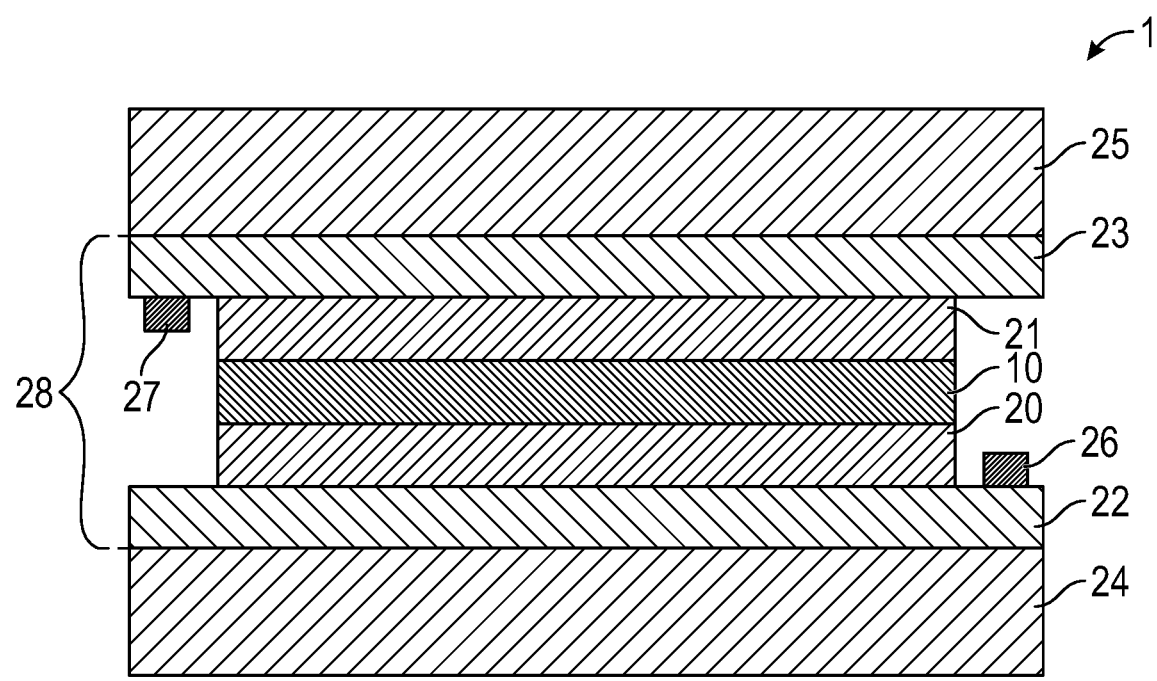
FIG. 1 is a schematic of a cross-section structural diagram of an electrochromic device.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

ABBREVIATIONS AND DEFINITIONS

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The terms "anodic electrochromic layer" and "anodic electrochromic material" refer to an electrode layer or electrode material, respectively, that upon the removal of ions and electrons becomes less transmissive to visible radiation.

The terms "cathodic electrochromic layer" and "cathodic electrochromic material" refer to an electrode layer or electrode material, respectively, that upon the insertion of ions and electrons becomes less transmissive to visible radiation.

The "CIE-Lab" color space is used herein to describe the color of the substrate or device in the bleached or colored state. In this color space, L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values. The CIE-Lab color space is also referred to as the CIE L*a*b* color space, or the CIELAB color space, which is specified by the International Commission on Illumination (or in French, Commission Internationale de L'Éclairage) hence its CIE initialism). The scaling and limits of the a* and b*axes will depend on the specific implementation of Lab color, as described below, but in this disclosure a* and b* vary over the range of ±100. The closer to zero (0) of the a* or b* values, then the more neutral the coloration.

The term "clear state" of an electrochromic device or panel refers to a state at, or very close to, the most transmissive state of the device of panel. In practice, the clear state of an electrochromic device or panel is achieved when the device or panel is switched towards the most transparent state, and the rate of change of the visible transmittance reaches a minimum. The term "dark state" of an electrochromic device or panel refers to a state at, or very close to, the least transmissive state of the device of panel. In practice, the dark state of an electrochromic device or panel is achieved when the device or panel is switched towards the least transparent state, and the rate of change of the visible transmittance reaches a minimum. The clear state and the dark state are described as the "bleached state" and the "colored state" respectively in the ASTM standard E2355-10: Standard Test Method for Measuring the Visible Light Transmission Uniformity of an Absorptive Electrochromic Coating on a Glazing Surface. Furthermore, in section 8.1 of ASTM E2355-10, there is a description for how to reach steady state in the clear state or the dark state before taking optical measurements (e.g., optical uniformity), which provides some guidelines for operating electrochromic modules. One such useful guideline is that steady state will be reached approximately 30 minutes after the change of state has been initiated, however, the document goes on to say that the time required to reach steady state "shall take into account variations in the dynamic response between samples from different manufacturers, of different technologies, and of different size." It should be noted that the particular values of visible transmission of the clear state and the dark state of an electrochromic device or panel can change over time.

The term "tinted state" (or "tint state") of an electrochromic device or panel refers to states with optical transmission between that of the clear state and dark state. In other words, the tint states are states with transmission between states at, or very close to, the most and least transmissive states of an electrochromic device or panel.

The term "color uniformity" refers to the spatially uniformity of the color of an electrochromic device or panel. An example of a measure of color uniformity is the metric deltaE between two points in a device or panel.

The term "deltaE" (or "ΔE*ab", or "ΔE*", or "ΔE", or "dE*", or "dE") refers to a difference in color in the CIE L*a*b* color space, and is defined as:

$$\Delta E = \sqrt{(L_2^* - L_1^*)^2 + (a_2^* - a_1^*)^2 + (b_2^* - b_1^*)^2} \quad (1)$$

The term "electrochromic material" refers to materials that change in transmissivity to visible radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "gradient transparent conductive layer" refers to an electrically conducting layer with spatially varying sheet resistance, or resistance to current flow substantially parallel to a major surface of the layer, that varies as a function of position within the electrically conductive layer. Additionally, a gradient transparent conductive layer is transmissive to electromagnetic radiation having a wavelength in the visible range.

The term "perceptible" as used herein with respect to color differences, refers to color differences which can be perceived by an average human eye. For example, in some regions of the CIE-Lab color space, the average human eye cannot perceive differences in color less than about deltaE equal to 1. Similarly, the term "no perceptible color difference", refers to two colors that are close enough in color that they cannot be perceived as being different by an average human eye. The term "no perceptible color" as used herein refers to a color that is close enough in color to neutral (i.e., where $a^*=0$ and $b^*=0$) that the color cannot be perceived as being different than neutral by an average human eye. Quantifying sets of perceptually uniform colors is known to those skilled in the art as the set of points whose distance to the reference is less than the just-noticeable-difference (JND) threshold. In the CIE 1931 color space, for example, the tolerance contours of sets of perceptually uniform colors are bounded by MacAdam ellipses, which hold $L^*$ (lightness) fixed, and the ellipses denoting the tolerance contours vary in size. Furthermore, the sizes of the ellipses in the $a^*$ and $b^*$ plane that bound the sets of perceptually uniform colors can vary for different values of $L^*$.

The terms "switching speed" or "switching time" refers to the amount of time required for an electrochromic device or panel to transition from the dark state to a tinted state, or from the clear state to a tinted state, over a Tvis range that is 90% of the full absolute percentage range from clear to dark. For example, if an electrochromic device has a clear state with a Tvis of 71% and a dark state with a Tvis of 1%, then 90% of the full absolute percentage range is 63%, and the switching speed would be the amount of time required for the device to switch from the clear state to a tinted state of 8%, or the amount of time required for the device to switch from the dark state to a tinted state with a Tvis of 64%.

The term "visible transmittance" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 380-780 nm using the spectral photopic efficiency I_p(lambda) (CIE, 1924) as a weighting factor. (Ref: ASTM E1423).

DETAILED DESCRIPTION

Embodiments of the current invention describe tiled electrochromic (EC) devices for use in various glazing applications such as architectural or transportation windows. Embodiments of the current invention include tiled EC devices containing a carrier glass, a first EC device laminated to the carrier glass, a second EC device laminated to the carrier glass, and a seam between the first and second EC device, where in at least one state the switchable EC devices are transparent or translucent (or having at least one clear state). Embodiments of the current invention also include methods of production of tiled EC devices, containing a carrier glass, a first EC device laminated to the carrier glass comprising a clear state and a dark state, a second EC device laminated to the carrier glass comprising a clear state and a dark state, and a seam between the first and second EC device. In some embodiments the visibility of the seam and the electrical connections (such as wiring and bus bars) may be minimized or obscured to minimize any impact to the viewable area of the window.

A large area EC device is advantageous for various reasons including ease of installation and visual aesthetics. Large area tiled EC devices are advantageous because, in some embodiments, tiled EC devices containing smaller EC devices are easier to fabricate than a single large EC device that is not tiled.

In some embodiments, the seams between the EC devices in the tiled EC devices are invisible, or not very noticeable, or have minimized visual appearance. In other embodiments, the seams between the EC devices in the tiled EC devices are masked or otherwise covered to hide the seams. In some embodiments, the hidden seams between EC devices in tiled EC devices are oriented horizontally or vertically.

In some embodiments, the tiled EC devices have optimized visual characteristics including the uniform transitioning from one optical state to another across the entire tiled EC device (e.g., where all tinted states have a deltaE between any two points within the active area of the device less than 10 across the area of the device), a clearer clear state with no perceptible color (e.g., where the clear state has an average CIE-Lab $b^*$ from 3 to 6, an average CIE-Lab $a^*$ from −4 to 2, and an average CIE-Lab $L^*$ from 85 to 90), and/or a more black colored dark state (e.g., where the dark state has an average CIE-Lab $b^*$ from −5 to −2, an average CIE-Lab $a^*$ from −7 to −5, and an average CIE-Lab $L^*$ from 10 to 30).

The tiled EC devices described herein may be used in many applications such as architectural or transportation. The architectural applications may include glass used on the exterior of the building such as windows or walls. The architectural applications may also include interior applications such as partitions, windows, or doors.

EC Multilayer Stacks

Figure 2:
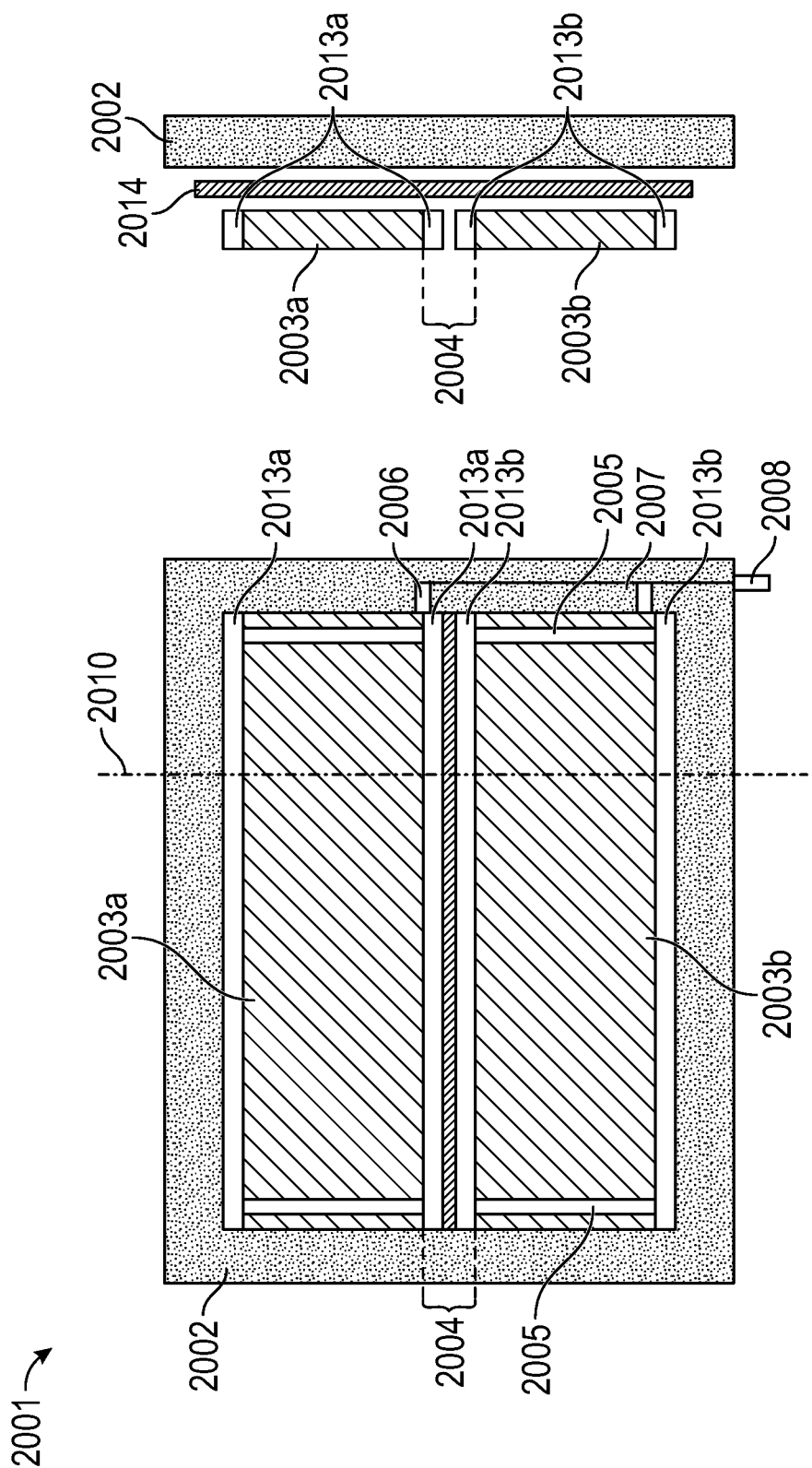
FIG. 2A is a top-down view of a tiled electrochromic device containing two electrochromic panels with their bus bars aligned and one seam.
FIG. 2B is a side view of the tiled electrochromic device of FIG. 2A, showing electrochromic panels within the tiled electrochromic device.
Figure 3:
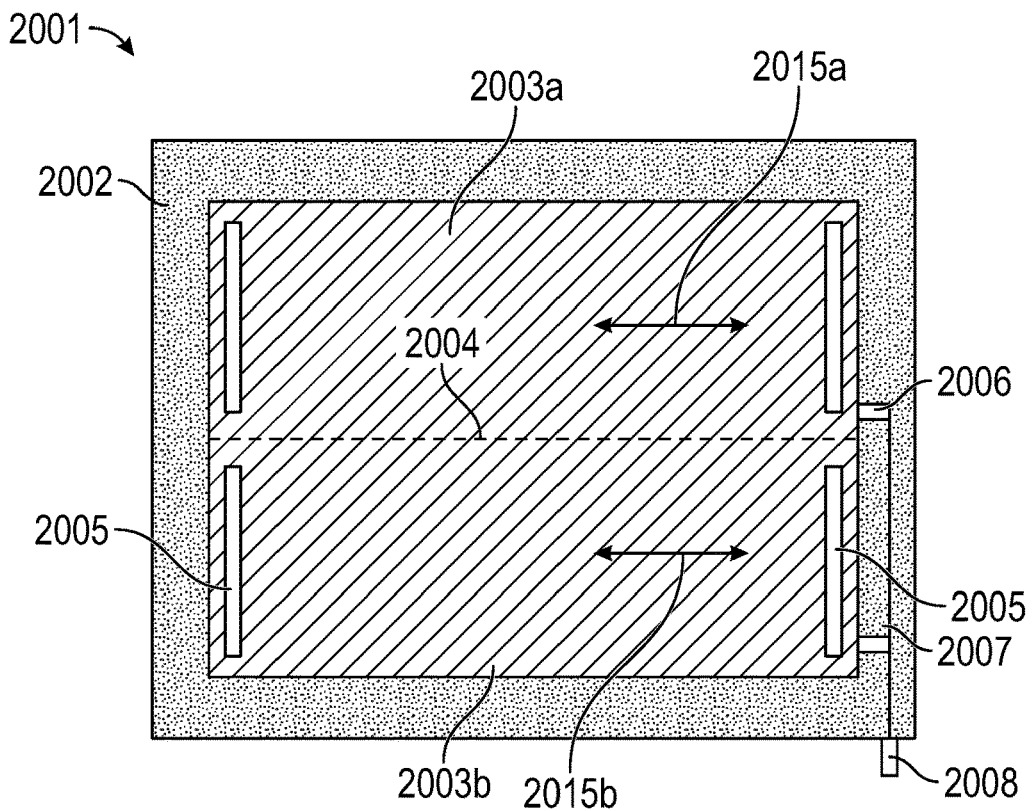
FIG. 3 is a top-down view of a tiled electrochromic device containing two electrochromic panels with aligned gradient electrically conductive layers and one seam.

FIG. 2 depicts a cross-sectional structural diagram of EC device 1 according to a first embodiment of the present disclosure. Moving outward from the center, EC device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises EC material; in one embodiment, first and second electrode layers 20, 21 each comprise EC material. The central structure, that is, layers 20, 10, 21, is positioned between first and second electrically conductive layers 22 and 23 which, in turn, are arranged against "outer substrates" 24, 25. Any layered stack containing an electrochromic cathode or anode (e.g., layer 20 or 21 in FIG. 2) is referred to as an EC stack or an EC multilayer stack. In some embodiments, elements 20, 10, and 21, and optionally elements 20 and/or 23, are collectively referred to as an EC stack or an EC multilayer stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the EC stack 28 may be changed by applying a voltage pulse to electrically conductive layers 22 and 23. The pulse causes electrons and ions to move between first and second electrode layers 20 and 21 and, as a result, EC material in the first and/or second electrode layer(s) change(s) optical states, thereby switching EC stack 28 from a more transmissive state to a less transmissive state, or from a less transmissive state to a more transmissive state. In one embodiment, EC stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by EC materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an EC device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific EC device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an EC transition is not limited to any particular wavelength or range of wavelengths. As understood by those of skill in the art, the choice of appropriate EC and counter electrode materials governs the relevant optical transition. In some embodiments, an EC device will have an active area that switches between less transmissive and a more transmissive states, and one or more inactive areas that do not have the same optical properties as the active area. Some examples of inactive areas are a border around the periphery of the device, one or more areas near the edge of the device, and one or more areas near the corner of the device.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

In some embodiments, cathode materials for EC multilayer stacks and EC devices include metal oxides including Ti, Zr, Hf, V, Nb, Ta, Cr, Mo, W, Sn, Sb and Bi and combinations thereof, that color under charge insertion (reduction). In some embodiments, cathodically coloring films include oxides based on tungsten, molybdenum, niobium, and/or titanium.

In some embodiments, anode materials for EC multilayer stacks and EC devices include metal oxides including Ni, Fe, W, Zn, Y, Ti, Zr, Hf, V, Nb, Ta, Mo, B, Al, Ga, In, Si, Ge, Sn, P, Sb, Te, Mn, Co, and combinations thereof, that color upon charge extraction (oxidation). A variety of anodically coloring films including Ni, Ir, and Fe are known in the art and can be prepared by a number of deposition processes including vapor deposition processes, wet-coating processes, spray coating processes, dip coating, and electrodeposition. Many of these anodic films are mixed metal oxides where lithium or protons are intercalated to balance charge during cycling. Additionally, non-oxide based films such as Prussian blue materials can be useful as anodic electrochromic films. In one embodiment, anodically coloring films include oxides, hydroxides and/or oxy-hydrides based on nickel, iridium, iron, chromium, cobalt and/or rhodium.

Ion conductor layer 10 serves as a medium through which ions are transported (in the manner of an electrolyte) when the electrochromic device switches between an optically less transmissive ("colored") state and an optically more transmissive ("bleached") state. Stated differently, the ion conducting layer permits sufficient ionic conduction between the first and second electrode layers 20, 21 upon the application of a voltage across electrochromic stack 28.

The thickness of the ion conductor layer 10 will vary depending on the material. In some embodiments using an inorganic ion conductor the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick.

In one embodiment, the ion-conducting film is produced from the ion conducting formulation by depositing the liquid formulation on the anode film, cathode film, or both films in a sufficient quantity to form a continuous pre-crosslinked film having a uniform thickness between 50 and 500 microns between the anode and cathode plates. This assembly may then placed in a vacuum laminator and heated under vacuum to form a sealed assembly. Polymerization of the monomer/comonomer may be initiated either thermally or photochemically. In one embodiment, any thermal processing of the device, particularly one where plastic is as the substrate, is below the temperature of 200° C., and more particularly 150° C., and even more particularly 100° C.

Alternatively, free standing fully formulated ion-conducting films may be used in place of the crosslinking IC formulation or the liquid IC formulation may used in a "cast in place" process where a pre-formed cavity between the anode and cathode is produced (edge sealed) and the formulation is forced into this cavity through fill ports.

Gradient TCOs for EC Devices

Figure 4:
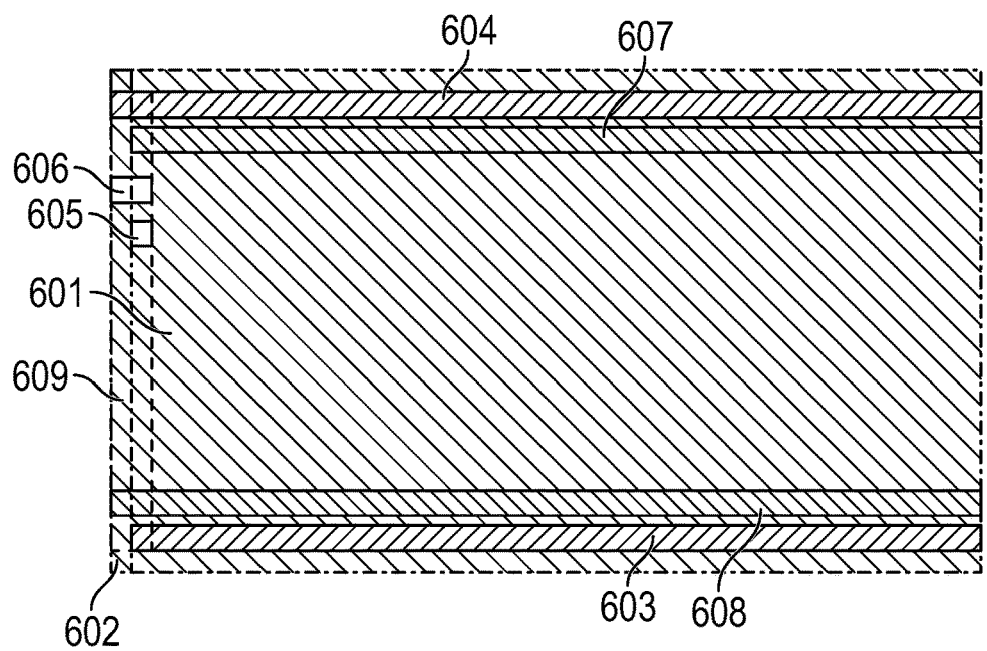
FIG. 4 is a top-down view of an electrochromic panel in accordance with some embodiments.

FIG. 4 illustrates an EC panel (i.e., a device) 500 having a cross-section 501, in some embodiments. The panel is a "sandwich" of the EC device materials between two substrates 510. The substrates may be either glass or plastic or any other transparent material. Each of the substrates 510 has electrically conducting layers (ECLs) 520 and 525. The electrically conducting layers are formed of a transparent conductive layer, such as a transparent conductive oxide (common materials include indium titanium oxide and tantalum tin oxide) though may be any material meeting the requirements of being transparent and electrically conductive. In some embodiments, one or both of the electrically conducting layers are gradient electrically conductive layers. An electrically conductive layer with a "gradient", as defined herein, refers to an electrically conducting layer with spatially varying sheet resistance, or resistance to current flow substantially parallel to a major surface of the layer that varies as a function of position within the electrically conductive layer. Other embodiments include, a "gradient ECL", or a "gradient TCO", or a "gradient transparent conducting layer", all of which are electrically conducting layers with gradients as defined above. In the embodiments depicted in 501 the electrically conducting layers are a gradient based on thickness of the transparent conductive oxide (TCO) material and have an inverse symmetry. The electrically conducting layer 520 is thinnest on the left side and becomes thicker as it moves towards the right side. The electrically conducting layer 525 has the inverse symmetry and is thicker on the left side and becomes thinner as it moves towards the right side. In other embodiments, as illustrated by the top down and side view schematics in FIG. 5, the resistance gradient in the transparent conductive layer may be formed by different techniques such as by creating a gradient in the composition of the transparent conductive layer as shown in 601 or by patterning the materials with a scribe or etchant as shown in 603 to effectively create an "electron maze." Regardless of the technique used the gradients may have an inverse symmetry to one another. The gradient transparent conductive layer allows for the use of EC devices in panels used for large scale applications such as architectural windows or in transportation applications such as buses and trains or automobiles. This is because with a gradient transparent conductive layer there is not a drop in effective voltage across the EC panel 500 once the voltage is applied to the EC device at the bus bars 550 which provides for a uniform transition between tint states across all dimensions of the EC panel. More details on gradient transparent conductive layers and different embodiments applicable to the EC devices described in this specification can be found in U.S. Pat. No. 8,717,658 entitled EC Multi-Layer Devices With Spatially Coordinated Switching (incorporated herein by reference), U.S. Pat. No. 9,091,895 EC Multi-Layer Devices With Composite Electrically Conductive Layers (incorporated herein by reference), U.S. Pat. No. 9,091,868 EC Multi-Layer Devices With Composite Current Modulating Structure (incorporated herein by reference), and patent application number US 2014/0043668 EC Multi-Layer Devices With Current Modulating Structure (incorporated herein by reference.) The gradient transparent conductive layers 520 and 525 not only remove the "iris effect" problem that larger scale EC devices have by enabling the uniform transition between states across the entire surface of the EC panel, but enables the fast transition between tint states (i.e., a short switching time, or a fast switching speed) and in particular from the clear state to the dark state and vice versa.

FIG. 4 depicts an EC device with a single EC multilayer stack and gradient electrically conductive layers (ECLs) on both electrodes. In other embodiments described herein, gradient ECLs can be utilized in monolithic tandem EC multilayer stacks with two or more EC multilayer stacks. In tandem EC multilayer stack embodiments, gradient ECLs can be used on both electrodes in each EC multilayer stack making up the monolithic tandem EC multilayer stacks, or on one ECL in each of the EC multilayer stack making up the monolithic tandem EC multilayer stacks.

Electrical Connections in EC Devices

Electrical connections are required in EC devices primarily to connect the bus bars to drive circuitry. In some embodiments, additional electrical connections are also required as described below.

A driver is used to control the switching of EC devices described herein. In some embodiments, the switching speed of the electrochromic panels is optimized through the use of a proprietary drive circuit and drive scheme as illustrated in FIG. 10 and as described in more detail in U.S. patent application Ser. No. 14/994,091 entitled "Driver for Electrochromic Glass Unit", incorporated herein by reference. To summarize, the Vsense leads 1124 (Vsns+) and 1126 (Vsns−) allow for the constant monitoring of the voltage of the electrochromic device 1118 independent of the potential applied to the bus bars 1120. In some embodiments, the Vsense leads 1124 and 1126 are distinct from the bus bars 1120, and are located elsewhere than a location of the bus bars 1120. For example, the sense voltage terminals 1124 and 1126 could be connected to an interior region of the electrochromic device 1118, or various sense voltage terminals 1124, 1126 could be located along one or more edges of the electrochromic device 1118. The Vsense leads can provide feedback to control the voltage applied to the electrochromic device 1118 from VSource to the busbars 1120. This driver and drive scheme also allows for the selection of any tint state along a continuum of tint states between the dark state and the clear state. In some embodiments, the driver and drive scheme does not depend upon a "look-up" table of voltages to switch the panel to a clear state, dark state, or tinted state, but the amount of current and/or voltage applied to the bus bars is instead varied during switching. In some embodiments, the current and/or voltage applied to the bus bars is controlled in real-time by a user.

FIG. 4 illustrates additional regions of the EC device that require independent electrical connections, in some embodiments. For example, FIG. 4 shows a sequestration portion 560 along one edge of the electrochromic panel 560, in an embodiment. Sequestration is a chemical and/or electrical method to remove and/or restore ions to the anode, cathode and/or ion conductor. Over time there may be ionic build-up or depletion in the anode and/or cathode which can cause discoloration or performance issues. In one embodiment, excess lithium ions may build up in a LiNiOx anode due to the release of lithium from the composition. Sequestration can enable sustained clarity of electrochromic panels by correcting any discoloration over time, and also can be used to match the coloration and performance of groups of windows. In some embodiments, the electrochromic devices and/or panels described herein include one or more sequestration elements to maintain the clear state and the dark state CIE-Lab L*, a*, b* and/or Tvis values over time. Various embodiments of sequestration are described in more detail in application Ser. No. 14/994,087 entitled "Electrochromic multilayer devices with charge sequestration and related methods" and incorporated by reference herein. Also, in a multi-pane device an advantage is that one device can sequester in the clear state to sequester excess lithium from the anode and/or cathode while maintaining some level of shading and/or privacy by keeping the other pane in the dark state.

An electrochromic device is described herein with details of connections to terminals of the electrochromic device, in various embodiments. In many of the embodiments described herein, two substrates of the electrochromic device are laterally offset with respect to one another, forming a shelf or overhang that exposes some or all of the terminals of the electrochromic device. FIGS. 2, 6B, 6C, 7A, 7 and 8 describe examples of electrochromic devices and provide greater detail around the electronics and wiring of these exemplary devices. In this specification, embodiments of this electrochromic device are described as part of tiled EC devices. These embodiments provide different configurations of electrochromic devices that can be laminated to one or more pieces of carrier glass to form tiled EC devices.

In some embodiments, the upper substrate is coated with an electrically conductive layer and an electrode, the lower substrate is coated with an electrically conductive layer and an electrode, and then the upper and lower substrates are laminated together to form the electrochromic stack using the polymeric ion conductor layer between the substrates, forming a structure such as the one shown in the example in FIG. 2. In some embodiments, the electrically conductive layers are scribed to electrically isolate different regions of the device, such as the sense voltage terminal regions, sequestration regions, and a primary device region. In some embodiments, the electrically conductive layers are scribed using mechanical scribing, laser scribing, or masking (e.g., via lithography) followed by chemical etching. The electrically conductive layers can also be selectively deposited to electrically isolate different regions of the device, such as the sense voltage terminal regions, sequestration regions, and a primary device region.

The bus bars (e.g., elements 26 and 27 in FIG. 2), sense voltage terminals, and sequestration terminals can be connected to a circuit board. The circuit board can include connector leads, which interface with a connector. The connector, in turn, provides the electrical connection to the controller assembly, driver and/or the power supply through a cable harness.

In some embodiments, the bus bars, sense voltage terminals, and sequestration terminals are directly connected to the circuit board. Some examples of direct connections between the bus bars, sense voltage terminals, and sequestration terminals and the circuit board are soldered connections, ultrasonic welds, or conductive adhesive. In some embodiments, the bus bars, sense voltage terminals, and sequestration terminals can be connected to a conductive member, which is connected to the circuit board. Some examples of conductive members connecting the bus bars, sense voltage terminals, and sequestration terminals to the circuit board are metallic ribbon, copper ribbon, flexible ribbon cables, and conductive wires. Some examples of how the conductive members can be connected to the bus bars, sense voltage terminals, sequestration terminals, and the circuit boards are soldered connections, ultrasonic welds, or conductive adhesive.

The circuit boards described herein can be rigid or flexible. The circuit board substrate can be made from a rigid material such as woven fiberglass cloth impregnated with an epoxy resin, cotton paper impregnated with resin, aluminum, alumina, matte glass and polyester, or other rigid polymeric materials. Some examples of materials used in rigid circuit boards are FR-2, FR-4, G-10, CEM-1, CEM-2, PTFE, aluminum, and alumina. The circuit board substrate can be made from a flexible material such as, polyimide foil, polyimide-fluoropolymer composite foil, or other flexible polymeric materials. Some examples of materials used in flexible circuit boards Kapton and Pyralux.

In some embodiments, there is a connector between the circuit board and the cable harness. The connector between the circuit board and the cable harness can be a standard connector or a custom connector. Some examples of standard connector are ZIF connectors (zero insertion force connectors), hot bar solder connectors, and other types of flat flexible cable connectors. In some embodiments, the connector between the circuit board and the cable harness can be designed to fit in between the upper and lower substrate of the electrochromic device after assembly. The connector between the circuit board and the cable harness can be less than 5 mm thick, less 3 mm thick, or less than 1 mm thick.

Figure 6:
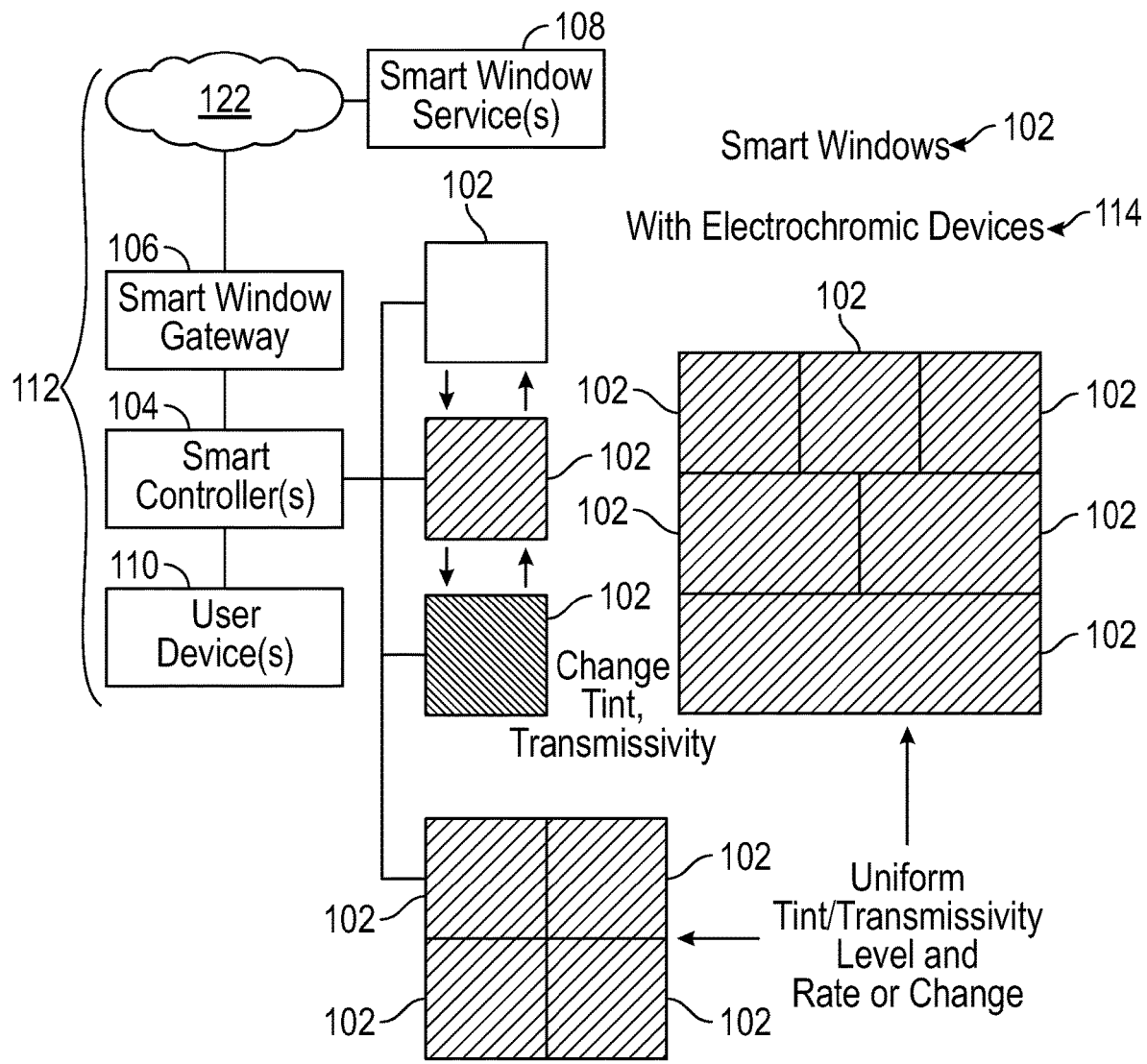
FIG. 6 is a system diagram showing a distributed device network controlling electrochromic panels within a tiled electrochromic device to varying levels of tint or transmissivity, and uniform levels and rates of change of tint or transmissivity.
Figure 7:
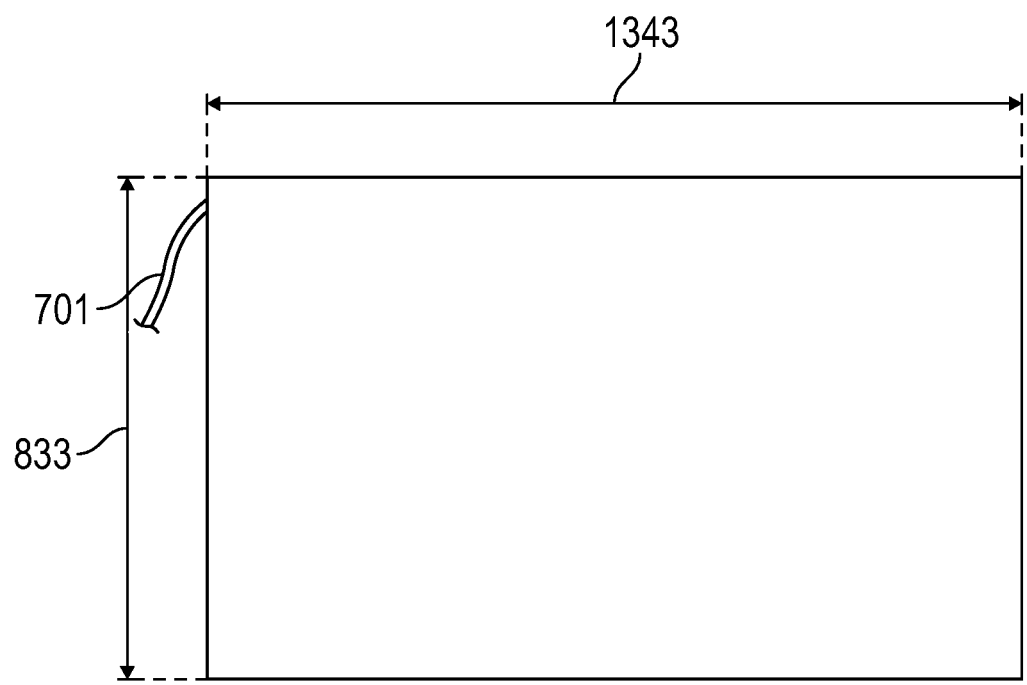
FIG. 7 is a top-down view of an electrochromic panel in accordance with some embodiments.
Figure 12:
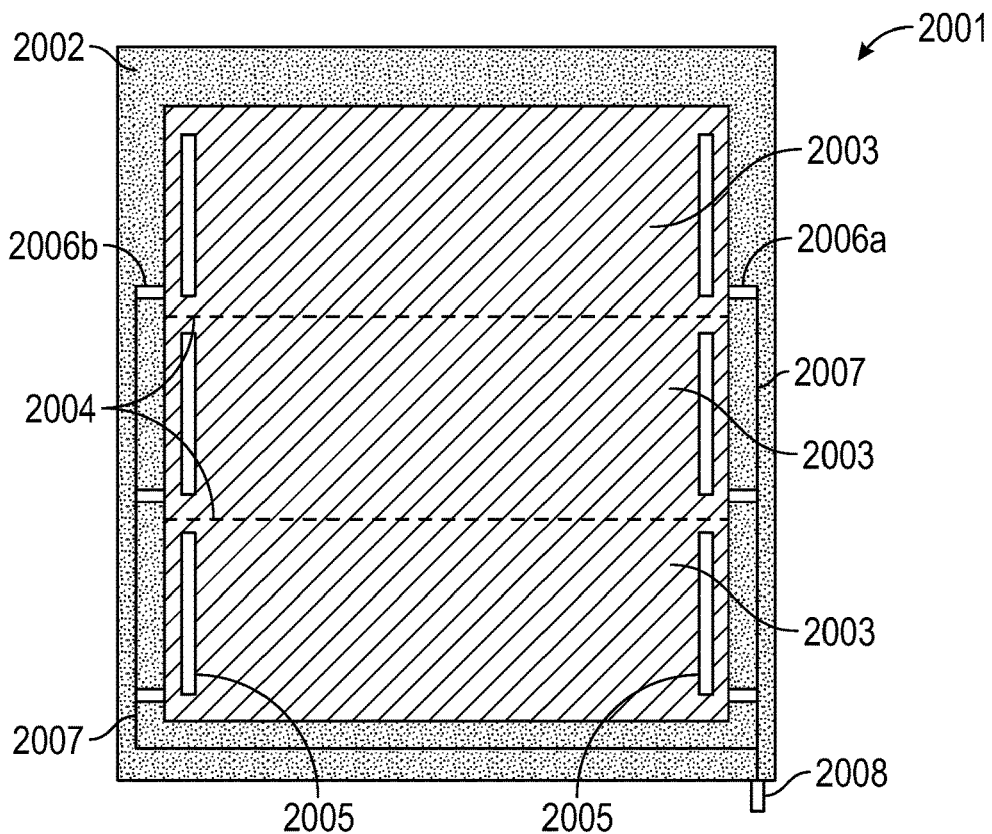
FIG. 12 is a top-down view of a tiled electrochromic device containing three electrochromic panels and two seams, where the connector leads exit the electrochromic panels adjacent to more than one edge of the tiled electrochromic device.
Figure 13:
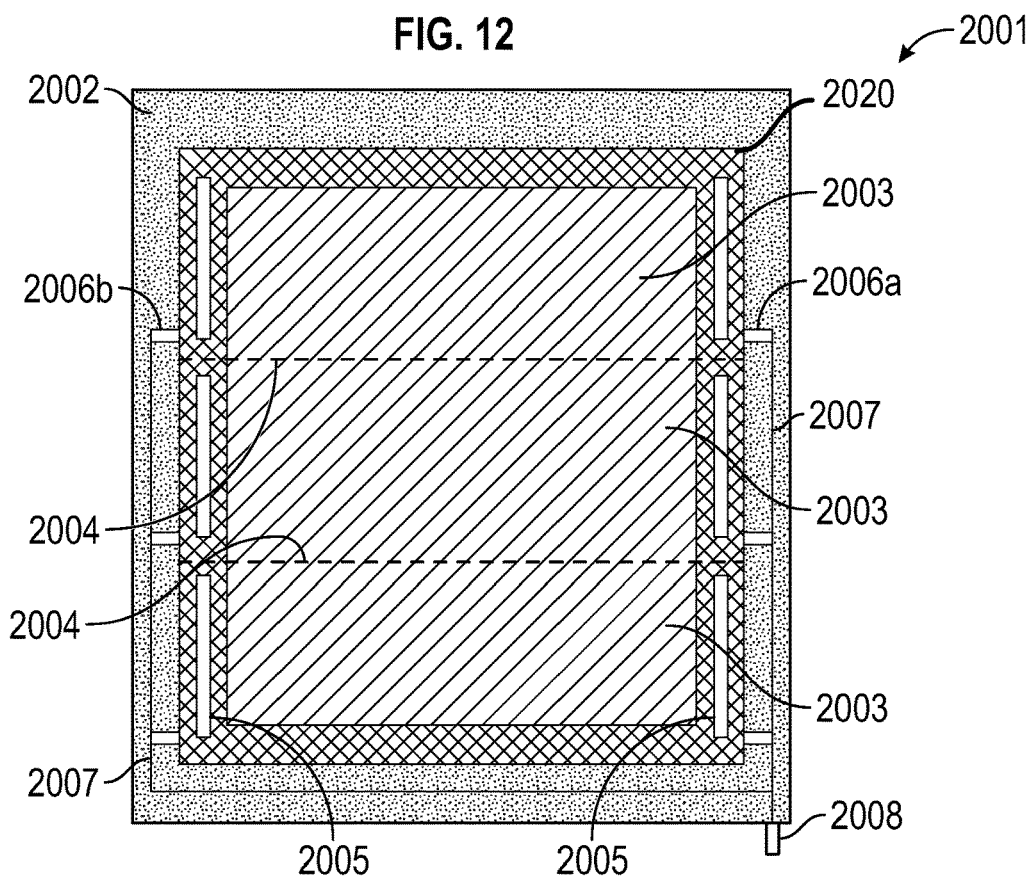
FIG. 13 is a top-down view of a tiled electrochromic device containing three electrochromic panels and two seams, with a covering along the periphery of the tiled electrochromic device.
Figure 14:
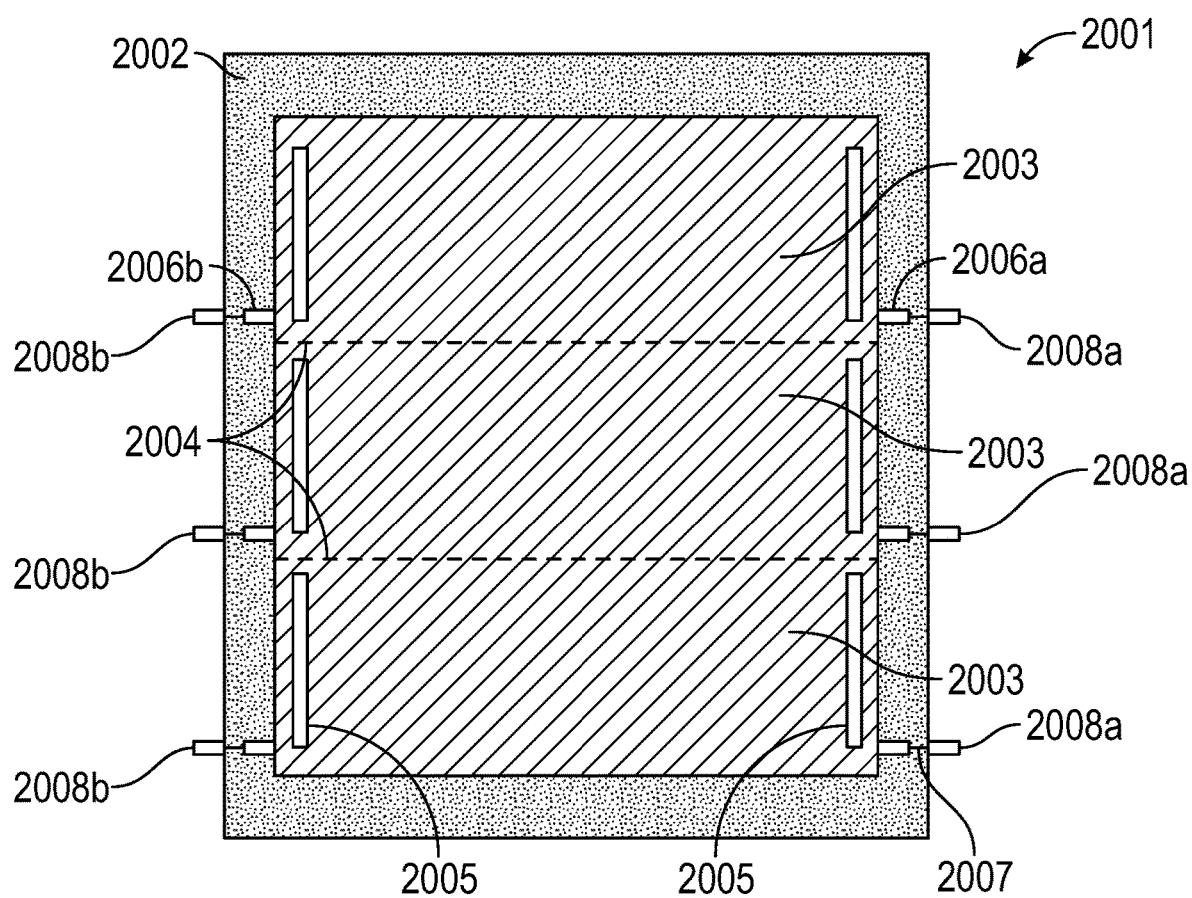
FIG. 14 is a top-down view of a tiled electrochromic device containing three electrochromic panels and two seams, with multiple connector leads for the tiled electrochromic device.
Figure 18:
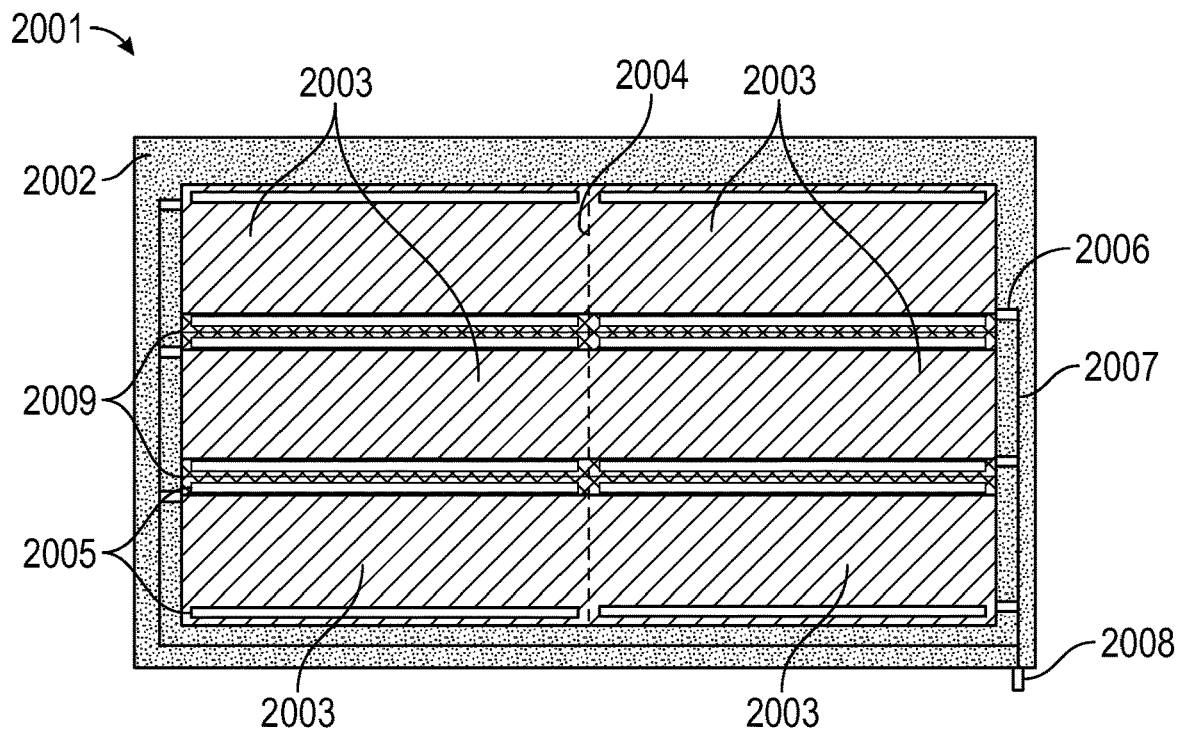
FIG. 18 is a top-down view of a tiled electrochromic device containing six electrochromic panels, with horizontally oriented coverings over some of the seams.
Figure 19:
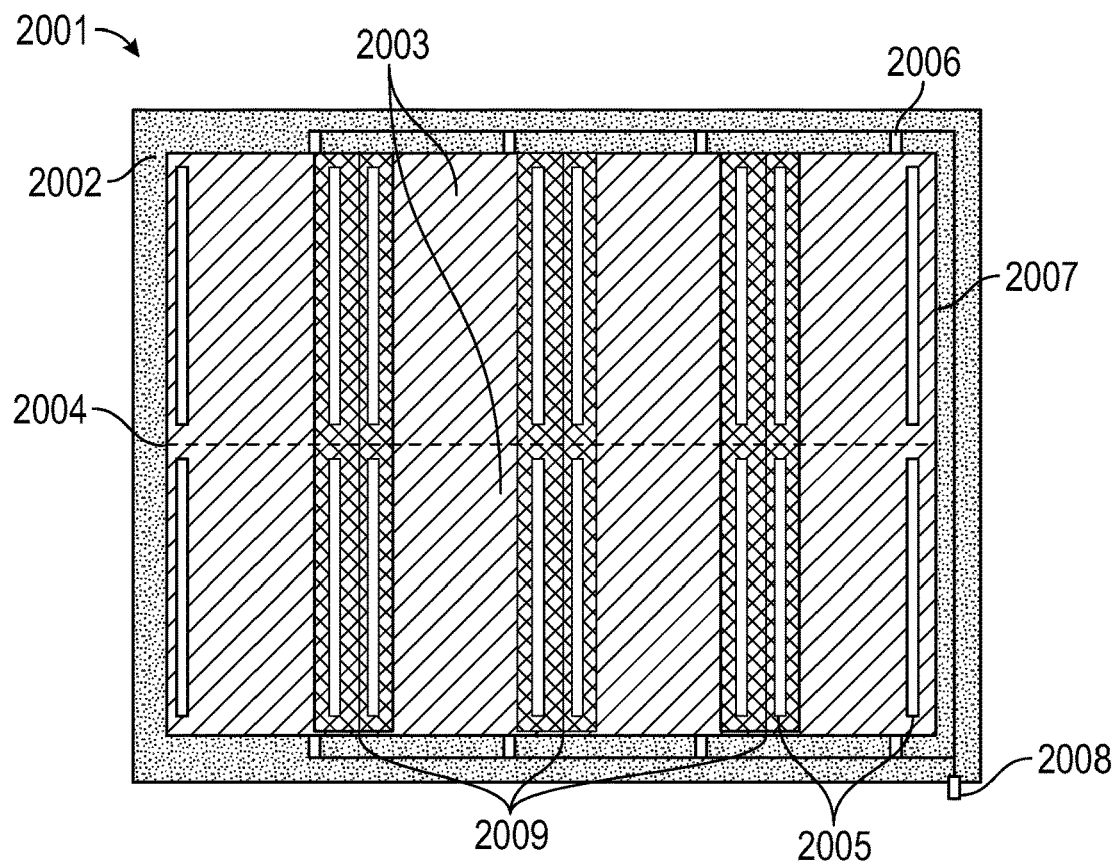
FIG. 19 is a top-down view of a tiled electrochromic device containing eight electrochromic panels, with vertically oriented coverings over some of the seams.

FIG. 6B shows an electrochromic device from the top-down, in an embodiment. The figure shows the bus bar connected to the electrode on the upper substrate (i.e., the upper bus bar) 603, the bus bar connected to the electrode on the lower substrate (i.e., the lower bus bar) 604, the sense voltage terminal on the upper substrate (i.e., the upper sense voltage terminal) 605, the sense voltage terminal on the lower substrate (i.e., the lower sense voltage terminal) 606, the sequestration terminal on the upper substrate (i.e., the upper sequestration terminal) 607, and the sequestration terminal on the lower substrate (i.e., the lower sequestration terminal) 608. The use of the terms "upper" and "lower" are to aid in the description of the invention and are not meant to be limiting. The components described in the figures may be referred to as upper and lower, but it is to be understood that any orientation of the components with respect to one another is possible. In this particular embodiment, the upper substrate 601, is smaller than the lower substrate 602 in one dimension, and the upper substrate 601 is offset in a lateral direction from the lower substrate 602 along one edge of the electrochromic device. In this embodiment, the lower bus bar 604, lower sense voltage terminal 606 and lower sequestration terminal 608 are exposed by the upper substrate 601 being offset in the lateral direction from the lower substrate 602.

In other embodiments, the upper substrate can be larger than the lower substrate in one dimension, and the bus bars, sense voltage terminals, and sequestration terminals on the upper substrate can be exposed by the lower substrate being offset in the lateral direction from the lower substrate.

In other embodiments, the upper substrate and lower substrate can be different sizes in more than one dimension, and be offset in more than one lateral direction. In other embodiments, the upper substrate and lower substrate can be the same dimensions, and be offset in one or more lateral dimensions, thereby creating one or more overhangs on both the upper and lower substrates.

In embodiments where the offset between upper and lower substrates exposes the bus bars, sense voltage terminals, and sequestration terminals on one of the substrates, the circuit board can make contact with these exposed elements. The circuit board can extend in between the two substrates to make contact to the unexposed elements (i.e., bus bars, sense voltage terminals, and sequestration terminals on the substrate that is not exposed). In some cases, a conductive member can be also be used to make contact to the unexposed elements (i.e., bus bars, sense voltage terminals, and sequestration terminals on the substrate that is not exposed), and the conductive member can be electrically connected to the circuit board.

Referring again the embodiment in FIG. 6B, the bus bars, sense voltage terminals, and sequestration terminals on the lower substrate are exposed and can be contacted after the upper and lower substrates are laminated together. The circuit board 609 extends between the upper and lower substrate, allowing the circuit board 609 to make contact with the unexposed upper sense voltage terminal 605 and upper sequestration terminal 607. The circuit board 609 also extends beyond the edge of the upper substrate, allowing a connector to make electrical contact to the circuit board 609 after the upper and lower substrates are assembled together.

In the embodiment shown in FIG. 6B, all of the connections between the circuit board 609 and the bus bars 603 and 604, sense voltage terminals 605 and 606, and sequestration terminals 607 and 608, can be direct electrical connections (i.e., do not require a conductive member between the circuit board and the bus bars, sense voltage terminals, and sequestration terminals). In other embodiments, some of these connections could also require a conductive member between the circuit board and one or more of the bus bars, sense voltage terminals, and sequestration terminals.

FIG. 6C shows a cross-section of the embodiment structure shown in FIG. 6B, where the upper substrate 601 is offset the lateral direction from the lower substrate 602. The cross-section of the embodiment in FIG. 6C shows that the upper bus bar 603 is unexposed after the upper and lower substrates are assembled together with the electrochromic stack (e.g., element 28 in FIG. 6A) between them, and the lower bus bar 604 is exposed after the upper and lower substrates are assembled together. The circuit board 609 is shown extending between the upper and lower substrates in order to make contact to the unexposed upper bus bar 603.

FIG. 6C also shows that the circuit board can have two surfaces, an upper surface 610, and a lower surface 611. The circuit board upper surface 610 can make electrical contact with the upper bus bar 603, and the circuit board lower surface 611 can make electrical contact with the lower bus bar 604.

For clarity in FIG. 6C, the upper and lower sense voltage terminals and the upper and lower sequestration terminals are not shown, but it should be understood that they can make connection to the upper and lower surfaces of the circuit board 609 in a similar configuration as the upper and lower bus bars. Referring back to FIG. 6B, it is clear that the upper and lower sense voltage terminals, and the upper and lower sequestration terminals, can connect to the circuit board 609 in a similar configuration as the upper and lower bus bars.

In some embodiments, before the substrates are laminated together, the circuit board 609 is electrically connected to the elements that will be unexposed after the substrates are laminated together. In the embodiment in FIG. 6C, the circuit board 609 can be electrically connected to the upper bus bar 603 on the upper substrate 601 before the upper substrate 601 and lower substrate 602 are assembled together. Then, after the upper substrate 601 and lower substrate 602 are assembled together, the circuit board 609 can be connected to the lower bus bar 604.

FIG. 7A shows a top-down view of an electrochromic device (e.g., element 1 in FIG. 6A), in an embodiment. In this embodiment, the electrochromic device is approximately a rectangle with dimensions 833 cm×1343 cm, but this is not mean to be limiting. The electrochromic device can have a shape other than a rectangle, or be a rectangle of many other dimensions. FIG. 7A also shows a cable harness 701, which is a cable that is electrically connected to the circuit board. In some cases, the cable harness can be terminated on one end with a connector that is electrically connected to the circuit board. The cable harness 701 can connect the circuit board to the controller assembly, driver and/or power supply to control and provide power to the electrochromic device.

In some embodiments, the EC devices in the tiled EC device will have cable harnesses used to connect the EC devices within the tiled EC device to each other, or independently to one or more drivers. In other embodiments, the EC devices in the tiled EC device will not have cable harnesses, and the EC devices within the tiled EC device will be connected to each other, or independently to one or more drivers, using the circuit boards, bus bars, ribbons, or other wiring elements.

FIG. 7B shows a side view of an electrochromic device in an embodiment. FIGS. 7A and 7B also show cut-lines A-A, B-B and C-C.

FIG. 8 shows a top-down view along cut-line C-C in FIG. 7B, that is rotated 90 degrees counterclockwise from the orientation shown in FIG. 7B. The embodiment in FIG. 8 shows that the upper substrate is offset in a lateral direction from the lower substrate along one edge of the electrochromic device. In this embodiment, the lower bus bar terminal 802, lower sense voltage terminal 804 and lower sequestration terminal 806 are exposed by the upper substrate being offset in the lateral direction from the lower substrate.

In the embodiment in FIG. 8, the circuit board 800 extends in between the upper and lower substrates and beyond one edge of the upper substrate. Since the circuit board extends in between the upper and lower substrates, the circuit board 800 can make direct electrical contact to the upper sense voltage terminal 803 and the upper sequestration terminal 805, even though they are unexposed after the upper and lower substrates are assembled together. In some embodiments, the circuit board is long enough to make direct contact to all of the terminals. However, in the embodiment shown in FIG. 8, the circuit board 800 is not long enough to make a direct connection to the upper bus bar terminal 801, or the lower sequestration terminal 806. Furthermore, since the upper bus bar terminal is unexposed after the upper and lower substrates are assembled together, in this embodiment an additional conductive member 808 (a copper ribbon) is used to extend the upper bus bar 801 beyond the edge of the upper substrate. In this embodiment, therefore, a conductive member 807 is required to connect the upper bus bar copper ribbon 808 and the lower sequestration terminal 806 to the circuit board 800. In this embodiment, the conductive member 807 is a pair of flexible ribbon cables making independent connections between the upper bus bar copper ribbon 808 and the circuit board 800, and between the lower sequestration terminal 806 and the circuit board 800. The ribbon cables making up conductive member 807 are stacked on top of one another, and therefore in FIG. 8, the flexible ribbon cable connecting the upper bus bar copper ribbon 808 and the circuit board 800 is visible, and the flexible ribbon cable connecting the lower sequestration terminal 806 and the circuit board 800 is hidden. The two flexible ribbon cables making up the conductive member 807 are electrically isolated from each other so that the upper bus bar and the lower sequestration terminal can be independently addressed. In other embodiments, conductive members are needed to make contact to the upper bus bar, lower bus bar, upper sense voltage terminal, lower sense voltage terminal, upper sequestion electrode, lower sequestration electrode, and/or any other electrical connections necessary.

FIG. 8 shows an embodiment where the circuit board 800 has an upper surface and a lower surface with electrical connections made on the upper surface and lower surface. In this embodiment, there are conductive wires, which are considered to be part of the circuit board, and there are notches in the insulative material of the circuit board, which expose portions of some of the wires so that electrical connections can be made on the upper surface and the lower surface of the circuit board. In this embodiment, the lower bus bar 802 and the lower sense voltage terminal 804 are electrically connected to the lower surface of the circuit board 800, and the upper sense voltage terminal 803, the upper sequestration terminal 805, and the flexible ribbon cables making up the conductive member 807, are electrically connected to the upper surface of the circuit board.

FIG. 8 shows an embodiment of the circuit board 800, showing the connector leads 809. The connector leads are configured to connect to a connector of a cable harness (as shown in element 701 in FIG. 7A). The circuit board 800 has a number of conductive traces 810 connecting the bus bar terminals, sense voltage terminals, and sequestration terminals to the connector leads 809, such that each of the bus bar terminals, sense voltage terminals, and sequestration terminals can be independently addressed by the driver. The conductive traces 810 on the circuit board 800 connecting the bus bar terminals 802 and 801 to the connector leads are wider than the conductive traces 810 between the sense voltage terminals 803 and 804 and sequestration terminals 805 and 806 and the connector leads 809 because the bus bars supply high currents required to switch the electrochromic device, while the sense voltage terminals and sequestration terminals carry lower currents. In some embodiments, the connector leads 809 are configured to interface with a standard connector (e.g., a ZIF connector) and multiple leads are tied together in order to carry the current required by the electrochromic device bus bars. The circuit board can be designed to supply current to the bus bars of the electrochromic device that are greater than 200 mA, or greater than 500 mA, or greater than 1000 mA, or greater than 1500 mA, or greater than 2000 mA, or greater than 2500 mA, or greater than 3000 mA, or from 200 mA to 5000 mA, or from 200 mA to 3000 mA, or from 500 mA to 3000 mA, or from 500 mA to 2000 mA.

FIG. 8 shows an embodiment of the circuit board, where there are a number of test pads 811 that remain exposed after the upper substrate and lower substrate are assembled together. These test pads enable electrical probing of the unexposed connections for testing purposes after the upper and lower substrates are assembled and after the circuit board and other conductive members are assembled and connected.

In some embodiments, the connector leads exit the EC device in a direction parallel to the bus bars, as shown in FIG. 8. In other embodiments, the connector leads exit the EC device in a direction perpendicular to the bus bars.

In some embodiments, the connector leads do not extend beyond the upper and lower substrates, and the upper and lower substrates of the EC device are offset to expose the connector leads, as shown in FIG. 8. In such cases, the connector leads can exit the EC device in a direction parallel to the bus bars (as shown in FIG. 8), or perpendicular to the bus bars (e.g., using a circuit board similar to the one shown in FIG. 8, with the connector leads making a 90 degree turn to exit the EC device on the left hand edge of the device in FIG. 8). The wiring configurations of these embodiments are designed to minimize any impact to the viewable area of the window.

In some embodiments, the connector leads do extend beyond the upper and lower substrates. In such cases, the upper and lower substrates can be offset or not. In such cases, conductive members (similar to elements 807 and 808 in FIG. 8) may be needed to make electrical contact between some, or all, of the electrical terminals on the EC device and the circuit board to connect all of the necessary elements of the EC device to the connector leads and the driver(s).

Tiled Electrochromic Device Embodiments

Lamination of EC Devices to Carrier Glass

In some embodiments, EC devices containing glass substrates are laminated to one or more pieces of carrier glass. For example, two or more EC devices, each containing top and bottom glass substrates, can be laminated to one piece of carrier glass to form a tiled EC device. In some embodiments, the bottom glass substrates of the EC devices are laminated to a first piece of carrier glass, and a second piece of carrier glass is laminated to the top glass substrates of the EC devices to form a tiled EC device. Such tiled devices are advantageous, because a single large area device can be fabricated from multiple smaller EC devices that is easier to install and/or more visually appealing than several smaller EC devices pieced together in a frame or other approach.

In some embodiments, the carrier glass is laminated to the electrochromic device to provide increased strength. In some embodiments, the substrate used as the substrate for the electrochromic device can be a type of glass that lacks the strength necessary for certain applications, and laminating or otherwise attaching the electrochromic device to one or more pieces of stronger carrier glass can increase the strength of the assembly and enable the electrochromic device to be used in various applications (e.g., windows in buildings or interior partitions). In such cases, one or both substrates of the electrochromic device could be laminated to annealed, strengthened, or tempered carrier glass to increase the strength of the electrochromic device and carrier glass laminate. In some embodiments, one or both electrochromic device substrates are laminated to carrier glass and one or both electrochromic device substrates have a greater than 90% probability of withstanding a thermal stress or withstand a thermal edge stress less than 100 MPa, or less than 80 MPa, or less than 60 MPa, or less than 50 MPa, or less than 40 MPa, or less than 35 MPa, or less than 30 MPa, or less than 25 MPa, or less than 20 MPa, or less than 15 MPa, or less than 10 MPa, or from 5 to 100 MPa, or from 5 to 80 MPa, or from 5 to 60 MPa, or from 5 to 50 MPa, or from 5 to 40 MPa, or from 5 to 30 MPa, or from 5 to 25 MPa, or from 5 to 20 MPa, or from 5 to 15 MPa.

In some embodiments, the carrier glass enables the use of various materials and manufacturing methods for producing the electrochromic device. For example, the glass for the substrate of the electrochromic device could not be heat strengthened or tempered, and therefore lack the strength (or edge strength) necessary for use in some applications. Alternatively, the electrochromic device could be on a non-glass flexible substrate such as a polymer or plastic. In some embodiments, one or both electrochromic device substrates are glass with sodium oxide (e.g., $Na_2O$) mole fraction less than 0.1%, or less than 1%, or less than 5%, or less than 10%, or from 0.0001% to 1%, or from 0.0001% to 5%, or from 0.0001% to 10%. In some embodiments one or both of the electrochromic device substrates are annealed glass with sodium oxide (e.g., $Na_2O$) mole fraction less than 0.1%, or less than 1%, or less than 5%, or less than 10%, or from 0.0001% to 1%, or from 0.0001% to 5%, or from 0.0001% to 10%. In some embodiments one or both of the electrochromic device substrates are glass with a boron oxide (e.g., $B_2O_3$) mole fraction greater than 0.1%, or greater than 1%, or greater than 5%, or from 0.1% to 20%, or from 0.1% to 15%, or from 0.1% to 10%. In some embodiments, one or both electrochromic device substrates are annealed glass with boron oxide (e.g., $B_2O_3$) mole fraction greater than 0.1%, or greater than 1%, or greater than 5%, or from 0.1% to 20%, or from 0.1% to 15%, or from 0.1% to 10%. In some embodiments, one or both electrochromic device substrates are glass or strengthened glass (such as annealed or tempered) with a coefficient of thermal expansion (between about 20° C. and 300° C.) less than 8 ppm/K, or less than 7 ppm/K, or less than 6 ppm/K, or less than 5 ppm/K, or less than 4 ppm/K, or from 2 to 8 ppm/K, or from 2 to 7 ppm/K, or from 2 to 6 ppm/KL, or from 3 to 6 ppm/K. In some embodiments, one or both electrochromic device substrates are thinner than 4 mm, or thinner than 3 mm, or thinner than 2 mm, or thinner than 1.5 mm, or thinner than 1.25 mm, or thinner than 1 mm, or thinner than 0.8 mm, or thinner than 0.6 mm, or from 0.3 mm to 4 mm, or from 0.3 mm to 3 mm, or from 0.3 mm to 2 mm, or from 0.3 mm to 1.5 mm, or from 0.3 mm to 1 mm, or from 0.5 mm to 4 mm, or from 0.5 mm to 3 mm, or from 0.5 mm to 2 mm, or from 0.5 mm to 1.5 mm, or from 0.5 mm to 1 mm. In one particular embodiment, the substrates used for the electrochromic device may be a low CTE (coefficient of thermal expansion) borosilicate glass having a density of approximately 2.2 g/cu-cm and has a thickness of less than about 1.0 mm, and may have a thickness of less than about 0.5 mm.

One or both substrates of the electrochromic device could be laminated to thicker annealed, strengthened, or tempered carrier glass to increase the strength of the electrochromic device and carrier glass laminate. The thickness of the carrier glass may be greater than 1.0 mm, or within a range of about 0.5 mm to 10 mm. For most residential applications the thickness of the carrier glass may be approximately 3.0 mm and for most commercial applications the thickness of the carrier glass may be approximately 6.0 mm.

In some embodiments, the individual EC devices are laminated to one or more pieces of carrier glass approximately the same size as the EC devices before two or more of the EC devices and the attached carrier glass are laminated to a larger piece of carrier glass to form a tiled ED device. Alternatively, two or more of the individual EC Devices can be tiled onto a first piece of carrier glass that has been sized to fit the two or more individual EC Devices and then sandwiched between a second piece of carrier glass having similar dimensions as the first piece of carrier glass.

In some embodiments, EC devices containing plastic substrates are laminated to one or more pieces of carrier plastic to form a tiled EC device. For example, two or more EC devices, each containing top and bottom plastic substrates, can be laminated to one piece of carrier plastic to form a tiled EC device. In some embodiments, the bottom plastic substrates of the EC devices are laminated to a first piece of carrier plastic, and a second piece of carrier plastic is laminated to the top plastic substrates of the EC devices to form a tiled EC device.

Tiled EC Device Layouts

In some embodiments, two or more EC devices are laminated to one or more pieces of carrier plastic to form a tiled EC device, and the EC devices are rectangular or square, and the tiled EC device is rectangular or square. In some embodiments, from 2 to 20, or 2, or 3, or 4, or 5, or 6, or 7, or 8, or 9, or 10, or 12, or 14, or 16, or 18, or 20 EC devices are laminated to one or more pieces of carrier plastic to form a tiled EC device.

Figure 20:
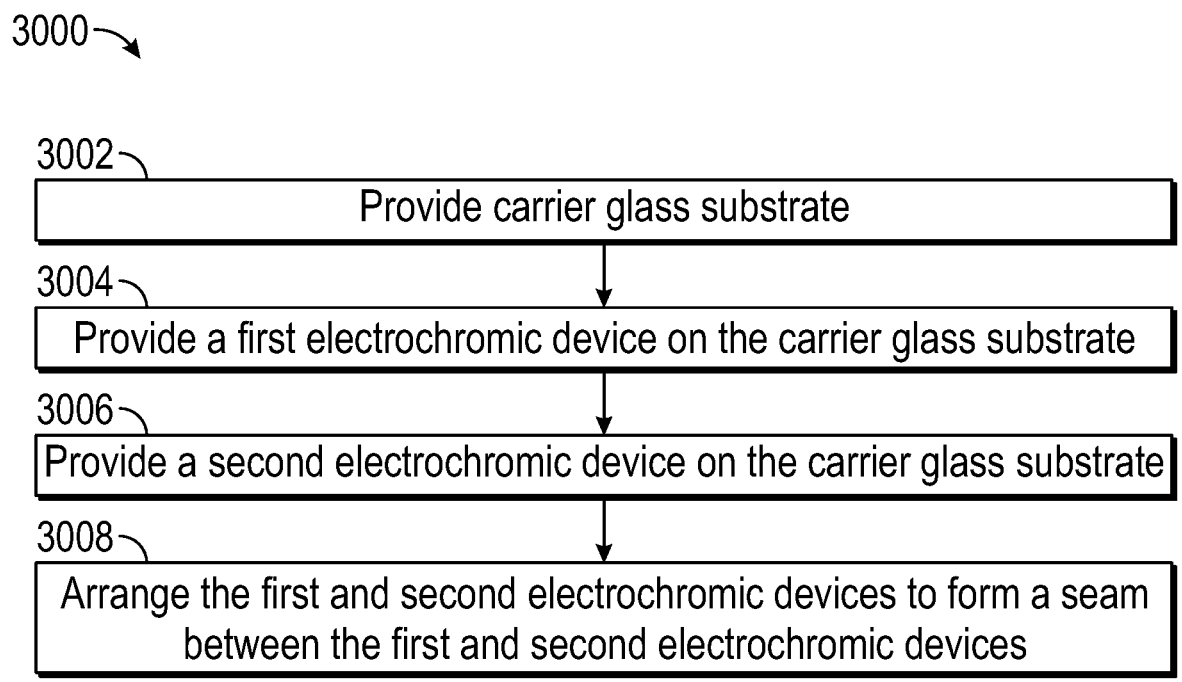
FIG. 20 is a flow diagram of a method of producing a tiled electrochromic device.

FIG. 20a is a schematic of a tiled EC device 2001, containing three EC devices 2003 laminated to a carrier glass 2002. The seams 2004 between the EC devices 2003 in the tiled EC device 2001 are shown as dotted lines in the figure, illustrating that it may be difficult for an average observer to see the seams, or the seams are hidden in some embodiments. In the exemplary tiled EC device in FIG. 20a, the bus bars 2005 are aligned with one another across the seams, and are all located along the peripheral edge of the tiled EC device. In this example, the connector leads 2006 exit the EC devices 2003 along the peripheral edge of the tiled EC device 2001, and the EC devices are electrically connected to a connector lead for the tiled EC device 2008 through wiring 2007.

The three EC devices 2003 in the tiled EC device shown in FIG. 20a are all approximately the same size and shape. FIG. 20b is a schematic of a tiled EC device 2001, containing three EC devices 2003 laminated to a carrier glass 2002, where the one of the three constituent EC devices has a different size and shape compared to the other two.

The examples in FIGS. 20a and 20b show rectangular EC devices with the bus bars along the shorter side of the rectangular devices, and stacked such that the seams occur along the longer side of the rectangular devices. In other embodiments, the same configurations as shown in FIGS. 20a and 20b could contain devices with the bus bars along the longer side of the rectangular devices, and stacked such that the seams occur along the shorter side of the rectangular devices, as shown in FIG. 20c.

FIG. 20c is a schematic of a tiled EC device 2001, containing two EC devices 2003 laminated to a carrier glass 2002. The seam 2004 between the EC devices 2003 in the tiled EC device 2001 is shown as a dotted line in the figure, illustrating that it may be difficult for an average observer to see the seams, or the seams are hidden in some embodiments. In the exemplary tiled EC device in FIG. 20c, the bus bars 2005 are aligned with one another across the seams, and are all located along the peripheral edge of the tiled EC device. In this example, the connector leads 2006 exit the EC devices 2003 along the peripheral edge of the tiled EC device 2001, and the EC devices are electrically connected to a connector lead for the tiled EC device 2008 through wiring 2007.

FIG. 20d is a schematic of a tiled EC device 2001, containing two EC devices 2003 laminated to a carrier glass 2002. The seam 2004 between the EC devices 2003 in the tiled EC device 2001 is shown as a dotted line in the figure, illustrating that it may be difficult for an average observer to see the seams, or the seams are hidden in some embodiments. In the exemplary tiled EC device in FIG. 20d, the bus bars 2005 are aligned with one another across the seams, and are all located along the peripheral edge of the tiled EC device. In this example, the connector leads 2006 exit the EC devices 2003 along the peripheral edge of the tiled EC device 2001, and the EC devices are electrically connected to a connector lead for the tiled EC device 2008 through wiring 2007. Unlike the example shown in FIG. 20a, the connector leads 2006 in FIG. 20d exit the EC devices 2003 along the edge of the device that is adjacent to the edge of the device where the bus bars are located. In contrast, the connector leads 2006 in FIG. 20a exit the EC devices 2003 along the same edge of the device where the bus bars are located.

FIG. 20e is a schematic of a tiled EC device 2001, containing three EC devices 2003 laminated to a carrier glass 2002. The seams 2004 between the EC devices 2003 in the tiled EC device 2001 are shown as dotted lines in the figure, illustrating that it may be difficult for an average observer to see the seams, or the seams are hidden in some embodiments. In the exemplary tiled EC device in FIG. 20e, the bus bars 2005 are aligned with one another across the seams, and are all located along the peripheral edge of the tiled EC device. In this example, there are connector leads 2006a and 2006b that exit the EC devices 2003 along two of the peripheral edges of the tiled EC device 2001, and the EC devices are electrically connected to a connector lead for the tiled EC device 2008 through wiring 2007. In this example, the connector leads 2006a and 2006b exit the electrochromic devices adjacent to more than one edge of the tiled electrochromic device. In other embodiments, the connector leads for the EC devices 2006a and 2006b can exit the EC devices 2003 adjacent to one, or two, or three or four of the edges peripheral edges of the tiled EC device 2001.

In some embodiments, the EC devices have active areas towards the center of the devices and inactive areas towards the periphery of the devices. In some embodiments, the EC devices have inactive areas near the bus bars of the EC devices. In some embodiments, the periphery of the tiled EC device (e.g., 2001 in FIG. 20a) has a frame or mask that can be used to hide or obscure the inactive areas and/or the bus bars in the EC devices (e.g., 2005 in FIG. 20a), and the electrical connections (e.g., 2006, 2007 and 2008 in FIG. 20a). FIG. 20f shows an exemplary device, with all of the features described for FIG. 20e, and additionally a covering 2010 along the periphery of the tiled EC device. The covering 2010 obscures the inactive areas, the bus bars in the EC devices, and the electrical connections for the tiled EC device.

FIG. 20g is a schematic of a tiled EC device 2001, containing three EC devices 2003 laminated to a carrier glass 2002. The seams 2004 between the EC devices 2003 in the tiled EC device 2001 are shown as dotted lines in the figure, illustrating that it may be difficult for an average observer to see the seams, or the seams are hidden in some embodiments. In the exemplary tiled EC device in FIG. 20g, the bus bars 2005 are aligned with one another across the seams, and are all located along the peripheral edge of the tiled EC device. In this example, there are connector leads 2006a and 2006b that exit the EC devices 2003 along two of the peripheral edges of the tiled EC device 2001, and the EC devices are electrically connected to connector leads for the tiled EC device 2008a and 2008b through wiring 2007. In some embodiments, the connector leads for the tiled EC device 2008a or 2008b can exit along one, or two, or three or four of the peripheral edges of the tiled EC device 2001. In some embodiments, each of the connector leads 2006a or 2006b for the EC devices 2003 can connect to a single connector lead for the tiled EC device 2008a or 2008b (as shown in FIG. 20g), or more than one of the connector leads 2006a or 2006b for the EC devices 2003 can connect to a connector lead for the tiled EC device 2008a or 2008b through wiring 2007 (e.g., all of the EC device connectors connect to a single tiled EC device connector in the exemplary device shown in FIG. 20e). In some embodiments, a tiled EC device contains several tiled EC device connectors (e.g., element 2008 in FIG. 20e), and each tiled EC device connector is connected to more than one connector lead from the EC devices within the tiled EC device (e.g., element 2006a in FIG. 20e).

In some embodiments, the seams between the EC devices (e.g., 2003 in FIG. 20a) in the tiled EC device (e.g., 2001 in FIG. 20a) hide or obscure the inactive areas at the edges of the EC devices that are adjacent to the seam. It may be desirable to minimize the size of the region between the EC Devices in the seam area to improve the aesthetics of the windows.

In some embodiments, the EC devices (e.g., 2003 in FIG. 20a) could be overlapped with each other when arranged on the carrier glass, such that the active areas appear approximately adjacent, and the inactive areas of the EC devices are made to be transparent and in front of, or behind, the active area of the adjacent device. In some embodiments, the inactive areas of the EC devices in a tiled EC device are transparent. For example, materials used to laminate the two substrates of the EC device together can be transparent.

FIG. 21a is a schematic of a front view of a tiled EC device 2001, containing three EC devices 2003 laminated to a carrier glass 2002. And FIG. 21b is a schematic of a cross-section of the tiled EC device 2001 in FIG. 21a taken through cut line 2010. The tiled EC device in these figures have similar elements as the tiled device shown in FIG. 20e. Each EC device in the tiled EC device in FIG. 21b has an active area 2003b, which can switch states between a clear state and a dark state, and peripheral regions 2003b at two or more edges of the EC devices. In some embodiments, the peripheral regions of the EC devices in the tiled EC device are transparent, translucent, or have high transmission. The example shown in FIG. 21b shows that the EC devices can be overlapped such that the active areas 2003b are adjacent to one another in adjacent EC devices in the tiled EC device. Since the active areas of adjacent devices line up with one another when viewed from the front, this is one example of a tiled EC device with seams 2004 that are invisible, or not very noticeable, or have minimized visual appearance. In some embodiments, a spacer 2011 is used behind any devices that are overlapped and are farther away from the carrier glass 2002. In some embodiments, the spacer 2011 is transparent, or absorbs very little light. For example, the spacer can be made of glass or a plastic with low light absorption. In some embodiments, the EC devices in FIGS. 21a and 21b are laminated to the carrier glass 2002, and the spacer 2011 (when included).

In some embodiments, the EC devices (e.g., 2003 in FIG. 20a) in tiled EC devices contain an environmental seal at the periphery of the device. For example, a barrier material (e.g., PIB) can be placed between the top and bottom substrate forming a ring around the periphery of the EC device, which will prevent environmental species (e.g., moisture or oxygen) from entering the interior of the EC device (or, reduce the amount of environmental species that can enter the interior of the EC device in a given amount of time). Such seals are typically important because the properties of many EC materials, ion conducting materials and electrically conductive materials can degrade over time if exposed to environmental species.

In some embodiments, a tiled EC device includes a top and bottom carrier glass, and the EC devices (e.g., 2003 in FIG. 20a) are sandwiched between the two carrier glass sheets. In such a case, the EC devices can contain an environmental seal at the periphery of the device, and an additional environmental seal can be included at the periphery of the tiled EC device. For example, a barrier material (e.g., PIB) can be placed between the top and bottom carrier glass of the tiled device forming a ring around the periphery of the tiled EC device, which will prevent environmental species (e.g., moisture or oxygen) from entering the interior of the tiled EC device. In other embodiments of tiled EC devices including a top and bottom carrier glass, the EC devices do not contain an environmental seal at the periphery of the device, or contain a less robust environmental seal at the periphery of the device, and an additional environmental seal can be included at the periphery of the tiled EC device. A less robust environmental seal, in this context, means a seal that has some environmental barrier properties, but is not as strong as robust environmental seals that are required in EC devices with no other seals. Some examples of less robust environmental seals are seals that are thinner than robust seals, seals that are more porous (e.g., lower density, or contain more defects) than robust seals, and seals that have lower concentration of environmentally absorbing additives than robust seals.

In some embodiments, a tiled EC device includes a top and bottom carrier glass, and the EC devices (e.g., 2003 in FIG. 20a) are sandwiched between the two carrier glass sheets, and a filler material is included between the EC devices that acts as an environmental barrier preventing environmental species (e.g., moisture or oxygen) from entering the interior of the EC device (or, reducing the amount of environmental species that can enter the interior of the EC device in a given amount of time).

In some embodiments, the environmental seals between the EC devices (e.g., 2003 in FIG. 20a) in a tiled EC device are configured such that the seams between the EC devices are invisible, or not very noticeable, or have minimized visual appearance. Some examples of environmental seals in these categories are thin seals or transparent seals. For example, a clear version of PIB can be used as an environmental seal in the EC devices in a tiled EC device, so that the inactive areas are transparent. For example, the device shown in FIG. 21b could include a clear environmental seal contained within the peripheral inactive regions 2003b, such that when the devices are overlapped and the active areas of adjacent devices line up with one another when viewed from the front, the peripheral regions 2003b do not absorb light (or absorb very little light), and the seals invisible, or not very noticeable, or have minimized visual appearance.

The example in FIG. 22a shows rectangular EC devices with the bus bars along the longer side of the rectangular devices, and stacked such that the seams also occur along the longer sides of the rectangular devices. In such a case, it can be advantageous to obscure the seams between the EC devices and the bus bars. In some embodiments, the seams are obscured using coverings 2009, which are masks, or frames, or additional members on top of the EC devices, or incorporated into the substrates of the EC devices.

FIG. 22a is a schematic of a tiled EC device 2001, containing three EC devices 2003 laminated to a carrier glass 2002. In the exemplary tiled EC device in FIG. 22a, the bus bars 2005 are all located along the seams between the EC devices, and there are coverings 2009 obscuring the seams and bus bars 2005. In this example, the connector leads 2006 exit the EC devices 2003 along the peripheral edge of the tiled EC device 2001, and the EC devices are electrically connected to a connector lead for the tiled EC device 2008 through wiring 2007.

The tiled device in FIG. 22a shows the seams and coverings running in a horizontal direction. In other embodiments, the seams and coverings can run in a vertical direction, as shown in the exemplary device in FIG. 22b. FIG. 22b is a schematic of a tiled EC device 2001, containing three EC devices 2003 laminated to a carrier glass 2002. In the exemplary tiled EC device in FIG. 22b, the bus bars 2005 are all located along the seams between the EC devices, and there are coverings 2009 obscuring the seams and bus bars 2005. In this example, the connector leads 2006 exit the EC devices 2003 along the peripheral edge of the tiled EC device 2001, and the EC devices are electrically connected to a connector lead for the tiled EC device 2008 through wiring 2007.

FIG. 22c is a schematic of a tiled EC device 2001, containing six EC devices 2003 laminated to a carrier glass 2002. In the exemplary tiled EC device in FIG. 22c, the EC devices are arranged in a 2×3 array (i.e., 2 EC devices in the horizontal direction, and 3 EC devices in the vertical direction), and the bus bars 2005 are all located along the seams between the EC devices running in the horizontal direction, and there are coverings 2009 obscuring the seams and bus bars 2005. Additionally, there are seams between the EC devices that are not adjacent to bus bars 2004 running in the vertical direction, and are shown as dotted lines in the figure, illustrating that it may be difficult for an average observer to see the seams, or the seams are hidden in some embodiments. In this example, the connector leads 2006 exit the EC devices 2003 along the peripheral edge of the tiled EC device 2001, and the EC devices are electrically connected to a connector lead for the tiled EC device 2008 through wiring 2007.

FIG. 22c shows a tiled EC device with 6 rectangular EC devices arranged in a 2×3 array (i.e., 2 EC devices in the horizontal direction, and 3 EC devices in the vertical direction) with the longer edge of the EC devices oriented horizontally (i.e., the EC devices are in the "landscape" orientation), with the bus bars and coverings located along the longer edges of the EC devices. In other embodiments, a tiled EC device has 6 rectangular EC devices arranged in a 2×3 array (i.e., 2 EC devices in the horizontal direction, and 3 EC devices in the vertical direction) with the shorter edge of the EC devices oriented horizontally (i.e., the EC devices are in the "portrait" orientation), with the bus bars and coverings located along the shorter edges of the EC devices.

FIG. 22d is a schematic of a tiled EC device 2001, containing eight EC devices 2003 laminated to a carrier glass 2002. In the exemplary tiled EC device in FIG. 22c, the EC devices are arranged in a 4×2 array (i.e., 4 EC devices in the horizontal direction, and 2 EC devices in the vertical direction), and the bus bars 2005 are all located along the seams between the EC devices running in the vertical direction, and there are coverings 2009 obscuring the seams and bus bars 2005. Additionally, there are seams between the EC devices that are not adjacent to bus bars 2004 running in the horizontal direction, and are shown as dotted lines in the figure, illustrating that it may be difficult for an average observer to see the seams, or the seams are hidden in some embodiments. In this example, the connector leads 2006 exit the EC devices 2003 along the peripheral edge of the tiled EC device 2001, and the EC devices are electrically connected to a connector lead for the tiled EC device 2008 through wiring 2007.

FIG. 22d shows a tiled EC device with 8 rectangular EC devices arranged in a 4×2 array (i.e., 4 EC devices in the horizontal direction, and 2 EC devices in the vertical direction) with the shorter edge of the EC devices oriented horizontally (i.e., the EC devices are in the "portrait" orientation), with the bus bars and coverings located along the longer edges of the EC devices. In other embodiments, a tiled EC device has 8 rectangular EC devices arranged in a 4×2 array (i.e., 4 EC devices in the horizontal direction, and 2 EC devices in the vertical direction) with the longer edge of the EC devices oriented horizontally (i.e., the EC devices are in the "landscape" orientation), with the bus bars and coverings located along the shorter edges of the EC devices.

Furthermore, the same concepts described above can be applied to tiled EC devices with rectangular or square EC devices arranged in different sized arrays. For example, tiled EC devices can contain rectangular or square EC devices arranged in 1×2 (i.e., 1 EC device in the horizontal direction, and 2 EC devices in the vertical direction), 2×1, 1×3, 3×1, 1×4, 4×1, 2×2, 2×3, 3×2, 3×3, 2×4, 4×2, 4×4, 3×4, 4×3, 4×4, or larger arrays of any number of EC devices in the horizontal direction and any number of EC devices in the vertical direction.

In some embodiments, the carrier glass in the tiled EC devices have an area greater than 2 m$^2$, or greater than 3 m$^2$, or greater than 4 m$^2$, or greater than 5 m$^2$, or greater than 6 m$^2$, or greater than 8 m$^2$, or greater than 10 m$^2$, or greater than 15 m$^2$, or greater than 18 m$^2$, or greater than 20 m$^2$, or greater than 30 m$^2$, or greater than 40 m$^2$, or from 2 m$^2$ to 50 m$^2$, or from 2 m$^2$ to 20 m$^2$, or from 5 m$^2$ to 20 m$^2$, or from 10 m$^2$ to 20 m$^2$. In some embodiments, the EC devices contained in the tiled EC devices have an area greater than 0.1 m$^2$, or greater than 0.5 m$^2$, or greater than 1 m$^2$, or greater than 1.5 m$^2$, or greater than 2 m$^2$, or greater than 3 m$^2$, or greater than 4 m$^2$, or greater than 5 m$^2$, or greater than 10 m$^2$, or from 0.1 m$^2$ to 20 m$^2$, or from 0.1 m$^2$ to 10 m$^2$, or from 0.1 m$^2$ to 5 m$^2$, or from 0.1 m$^2$ to 4 m$^2$, or from 0.1 m$^2$ to 2 m$^2$, or from 0.5 m$^2$ to 2 m$^2$.

In some embodiments, tiled EC devices described herein contain EC devices arranged adjacent to one another on a carrier glass, and the space between the EC devices (i.e., the seams) have widths less than 10 cm, or less than 1 cm, or less than 0.5 cm, or less than 0.1 cm, or less than 0.05 cm, or less than 0.01 cm, or from 0.01 cm to 10 cm, or from 0.01 cm to 1 cm.

In some embodiments, the coverings 2009 obscuring the seams and bus bars 2005 in the above embodiments (e.g., in the devices depicted in FIGS. 22a-22d), or obscuring the inactive areas at the periphery of the device (e.g., in the device depicted in FIG. 20f), are colored such that the deltaE between any point within the coverings and any point within the active areas of the EC devices is less than 10, when the EC devices are in the dark state.

Multiple Pane EC Devices in Tiled EC Devices

In some embodiments the tiled EC devices described herein contain EC devices that are one EC device, or more than one EC device arranged so that the more than one EC devices are aligned so that their areas of greatest surface area are parallel to one another to in effect multiply the effect of the EC Device shading of the window glazing. In some embodiments, the EC devices described herein contain more than one EC device arranged such that incident light passes through both devices. An example is a device with two EC devices laminated together (a dual pane EC device), which has a very low Tvis in the dark state because the absorption of both devices is compounded. These types of multi-pane or dual-pane window glazings may be used as exterior windows that are part of an insulated glass unit (IGU) or as interior building partitions. The tiling of these multi-pane or dual pane EC Devices may utilize any of the methodologies or assemblies described herein.

Tiled EC Devices with Gradient Electrically Conductive Layers

In some embodiments, the tiled EC devices described herein contain EC devices that have one or more gradient electrically conductive layers (ECLs). In some embodiments, adjacent EC devices within the tiled EC device have gradient ECLs with the gradients oriented parallel to one another. The gradient ECLs in EC devices are advantageous in tiled EC devices because they enable large area EC devices to switch more quickly and more uniformly than devices without gradient ECLs.

Figure 5:
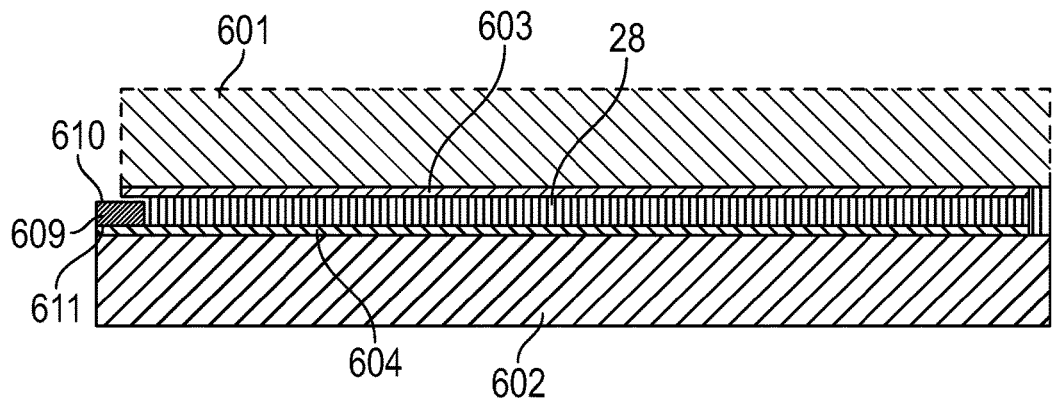
FIG. 5 is a cross-section view of an electrochromic panel in accordance with some embodiments.

As described in more detail above, and illustrated in FIGS. 4 and 5, the electrically conductive layers with the EC devices in tiled EC devices can have gradients with spatially varying sheet resistance, or resistance to current flow substantially parallel to a major surface of the layer that varies as a function of position within the electrically conductive layer. The gradients will typically have a particular dominant direction or orientation along which the electrical properties will vary. In some embodiments, the direction along which the electrical properties vary will be oriented parallel to one another in all of the EC devices, or in adjacent EC devices within a tiled EC device. Aligning the gradients of the EC devices within a tiled EC device can be beneficial since there can be some non-uniformity in the transmission of the EC devices during switching, which can be more visually appealing, and/or less noticeable, if the gradients between devices are oriented parallel to one another. In some cases, this can also cause the seams between the EC devices in the tiled EC devices to be less noticeable.

In some embodiments, the tiled EC devices described herein contain EC devices that have one or more gradient electrically conductive layers (ECLs) that create visually perceptible patterns in the EC devices. In some embodiments, the visually perceptible patterns are visible in the clear state, a tinted state, or the dark state at equilibrium. In some embodiments, the visually perceptible patterns are visible only when the device is switching, and are not visible at any state at equilibrium. In some embodiments, adjacent EC devices within the tiled EC device have visually perceptible patterns that are aligned with one another across the seam between the EC devices. In some embodiments, the direction along which the electrical properties vary will be oriented parallel to one another in all of the EC devices, or in adjacent EC devices within a tiled EC device, which will cause the visually perceptible patterns in adjacent devices to be aligned and cause the seams to be less noticeable.

Electrical Interconnects in Tiled EC Devices

In some embodiments the visibility the electrical connections (such as wiring and bus bars) may be minimized or obscured to minimize any impact to the viewable area of the window. FIGS. 20a-20f, and 22a-22d illustrate tiled EC devices containing a plurality of EC devices 2003. The bus bars 2005 of the EC devices and the electrical leads 2006 exiting the EC devices are shown. Additionally, tiled EC devices, such as those shown in FIGS. 20a-20f, and 22a-22d can contain other electrodes, terminals and electrical connections. For example, in addition to the two bus bars, the EC devices can contain a sense voltage terminal on the upper substrate (e.g., the upper sense voltage terminal 605 in FIG. 6B), a sense voltage terminal on the lower substrate (e.g., the lower sense voltage terminal 606 in FIG. 6B), a sequestration terminal on the upper substrate (e.g., the upper sequestration terminal 607 in FIG. 6B), and/or a sequestration terminal on the lower substrate (e.g., the lower sequestration terminal 608 in FIG. 6B). These additional electrodes, terminals and electrical connections can be arranged adjacent to the bus bars, (e.g., in the devices shown in FIGS. 20a-20f, and 22a-22d) and can be obscured by a covering at the periphery of the tiled EC device, or can be obscured by a covering along a seam.

In some embodiments, the electrical leads exiting the EC devices in the tiled EC device are connected to the electrodes, terminals and electrical connections in the EC devices using circuit boards, wires, and conductive ribbons, or other conductive members. The electrical connections shown in FIG. 8 are one example, but many other configurations exist. For example, conductive members with or without insulation can be used to traverse bus bars, sequestration elements and/or sense voltage electrodes to allow electrical contact between all of the elements and the connector leads, and thereby allow the connector lead to exit the EC device at any point.

In some embodiments, tiled EC devices contain a plurality of EC devices that have upper substrates and lower substrates that are the same or different sizes in one or more than one dimension, and/or be offset in one or more than one lateral direction, thereby creating one or more overhangs on both the upper and lower substrates. In some embodiments, the offset between upper and lower substrates exposes the bus bars, sense voltage terminals, and sequestration terminals to facilitate forming an electrical connection to the EC device. In some embodiments, a circuit board is used to make contact to the exposed elements, and/or can extend in between the two substrates to make contact to the unexposed elements (i.e., bus bars, sense voltage terminals, and sequestration terminals on the substrate that is not exposed). In some cases, a conductive member can be also be used to make contact to the unexposed elements (i.e., bus bars, sense voltage terminals, and sequestration terminals on the substrate that is not exposed), and the conductive member can be electrically connected to the circuit board.

In some embodiments, tiled EC devices contain a plurality of EC devices that are electrically connect in a series or parallel arrangement. In general, series connected EC multilayer stacks tend to have higher voltages and lower currents, while parallel connected EC multilayer stacks tend to have lower voltages and higher currents.

For example, the tiled EC devices shown in FIGS. 20a and 20e have electrical leads exiting one or both sides of the EC devices in a tiled EC device. The EC devices in FIGS. 20a and 20e can be wired in series or in parallel, depending on how the wires 2007, connector leads 2006, and electrical circuit boards and other connections within the EC devices (not shown) are configured.

Tiled Electrochromic Device Properties

Electrical Properties

In some embodiments, the EC devices in a tiled EC device are driven using one or more proprietary drive circuit and drive scheme as illustrated in FIG. 10 and as described in more detail in U.S. patent application Ser. No. 14/994,091 entitled "Driver for Electrochromic Glass Unit", incorporated herein by reference. To summarize, the Vsense leads 1124 (Vsns+) and 1126 (Vsns−) allow for the constant monitoring of the voltage of the electrochromic device 1118 independent of the potential applied to the bus bars 1120. In some embodiments, the Vsense leads 1124 and 1126 are distinct from the bus bars 1120, and are located elsewhere than a location of the bus bars 1120. For example, the sense voltage terminals 1124 and 1126 could be connected to an interior region of the electrochromic device 1118, or various sense voltage terminals 1124, 1126 could be located along one or more edges of the electrochromic device 1118. The Vsense leads can provide feedback to control the voltage applied to the electrochromic device 1118 from VSource to the busbars 1120. This driver and drive scheme also allows for the selection of any tint state along a continuum of tint states between the dark state and the clear state. In some embodiments, the driver and drive scheme does not depend upon a "look-up" table of voltages to switch the device to a clear state, dark state, or tinted state, but the amount of current and/or voltage applied to the bus bars is instead varied during switching. In some embodiments, the current and/or voltage applied to the bus bars is controlled in real-time by a user.

In some embodiments, all of the EC devices in the tiled EC device are driven by a single driver. In some embodiments, there is more than one driver driving the EC devices in the tiled EC device. In some embodiments, each EC device in the tiled EC device is driven by a dedicated driver.

In some embodiments, the EC devices in the tiled EC device are all switched together such that the optical properties (e.g., transmission and reflection) are coordinated and uniform across the entire tiled EC device. In some embodiments, the EC devices in the tiled EC device are switched together such that the optical properties (e.g., transmission and reflection) are coordinated and non-uniform across the entire tiled EC device. For example, a pattern could be created across the tiled EC device, or some devices could be left in the clear state or dark state while others are switched. In some embodiments, the EC devices in a tiled EC device are all switched together such that the optical properties are coordinated and uniform across the entire tiled EC device in the clear state, the dark state, and at all tinted states. In some embodiments, the EC devices in a tiled EC device are all switched together such that the optical properties are coordinated and uniform across the entire tiled EC device while transitioning from one transmissive state to another transmissive state (e.g., from the clear state to the dark state, or from the dark state to the clear state).

In some embodiments, a method of controlling tint for a plurality of EC devices in a tiled EC device, performed by a control system, is provided. The method includes receiving a request to change tint level of a plurality of EC devices in a tiled EC device, and consulting transfer functions for tint level relative to drive for each of the plurality of EC devices, wherein at least one of the plurality of EC devices has a transfer function differing from at least one other of the plurality of EC devices. The method includes driving each of the plurality of EC devices in accordance with the transfer functions, so as to coordinate tint level or rate of change of tint level across the plurality of EC devices.

In some embodiments, a controller with transmission level synchronization for EC devices is provided. The controller includes a memory, configurable to hold a plurality of transfer functions for tint level relative to drive of EC devices, and one or more processors configurable to couple to at least a first EC device and a second EC device and to perform a method. The method includes consulting a first transfer function for the first EC device, and a second transfer function for the second EC device, and driving the first EC device in accordance with the first transfer function, and the second EC device in accordance with the second transfer function, to coordinate tint level or rate of change of tint level of the first EC device and tint level or rate of change of tint level of the second EC device.

FIG. 24 is a system diagram showing a distributed device network 112 controlling smart windows 102 with electrochromic devices 114 to varying levels of tint or transmissivity, and uniform levels and rates of change of tint or transmissivity. Control of the electrochromic devices 114 is distributed throughout the smart windows 102, smart controllers 100 for, smart window gateway 106, smart window services 108 (e.g. cloud services available through the Internet or other network 112, or other network-available service) and user devices, i.e., the distributed device network 112, in various combinations and in various embodiments. Each electrochromic device 114 is controllable for tint or transmissivity, by driving charge into or out of the electrochromic device 114 as directed by the distributed device network 112. It is desired to drive multiple electrochromic devices 114 to a uniform tint or transmissivity level, and at a uniform rate of change of tint or transmissivity, for aesthetic reasons. Yet, different size electrochromic devices 114, or electrochromic devices 114 with different age or electrochromic chemistry, respond differently when driven identically. Various embodiments of the smart window system adjust the control of each of the various smart windows 102 and associated electrochromic devices 114 so as to achieve this uniform tint or transmissivity level or uniform rate of change of tinting or transmissivity, when such is desired. One mechanism for doing so is use of transfer functions as further described below.

FIG. 25A depicts transfer functions of tint versus charge for various electrochromic devices. The graph 302 depicts a family of transfer curves 304, 306, 308 that are possible for electrochromic devices 114. The perhaps ideal case is a linear, straight-line transfer function 304, in which the tint level is directly proportional to the total amount of charge transferred into the electrochromic device 114. Above the straight-line transfer function 304 is an upward facing convex transfer function 306, for another electrochromic device 114, in which relatively less total charge transfer gives relatively greater tint. Below the straight-line transfer function 304 is an upward facing concave transfer function 308, for yet another electrochromic device 114, in which relatively more total charge transfer gives relatively less tint, in comparison to the straight-line transfer function 304. Other shapes for transfer functions are possible.

FIG. 25B depicts transfer functions of tint versus charge for various sizes of electrochromic devices 114. The graph 310 depicts a family of transfer curves 312, 314, 316 of tint versus charge that are possible for different size electrochromic devices 114. The small electrochromic pane achieves a given tint level, up to 100%, for a total charge transfer of less than that for the medium size electrochromic pane, which in turn achieves that same tint level for a total charge transfer of less than that for the large size electrochromic pane. Each of these transfer functions 312, 314, 316 could have straight-line, convex or concave shape, or other shape as discussed above.

FIG. 26 is a flow diagram of a method of controlling transmissivity of multiple electrochromic devices, which can be practiced by embodiments of the controller and the distributed device network as shown in FIG. 24. The method can be practiced by one or more processors, such as processors in controllers and components in the distributed device network. In an action 2602, a request to change tint level of electrochromic devices is received. The request could be received from a user, through a user device, or could be received from one or more components of the distributed device network making a decision under various circumstances.

In an action 2604, transfer functions are consulted. The transfer functions are of tint level of an electrochromic device versus drive, for example charge transfer into or out of an electrochromic device. In various embodiments, the transfer functions are downloaded from a smart window service, are resident in memory in a controller, or are determined based on user feedback.

In an action 2606, an amount of charge to transfer to each electrochromic device is determined, based on tint level and the transfer functions. For example, for a specific tint level and electrochromic device, the relevant transfer function shows the amount of charge to transfer to the electrochromic device. In an action 2608, the electrochromic devices are driven, coordinating tint level or rate of change of tint level across the electrochromic devices. The controller drives the determined amount of charge, for each of the electrochromic devices, and in some embodiments controls the rate at which that charge is delivered (i.e., the current to or from the electrochromic device) and/or stops and starts driving a particular electrochromic device while comparing tint levels of electrochromic devices, based on the transfer functions and tracking charge transfer. In variations of the method, patterns are formed by controlling tinting of groups of electrochromic devices at a uniform rate or to a uniform level.

Optical Properties

In some embodiments, the tiled EC devices described herein have desirable optical properties. Some examples of desirable optical properties are uniform transitioning from one optical state to another across the entire device or panel (e.g., where all tinted states have a deltaE between any two points within the active area of the device less than 10 across the area of the device), a clearer clear state with no perceptible color (e.g., where the clear state has an average CIE-Lab $b*$ from 3 to 6, an average CIE-Lab $a*$ from −4 to 2, and an average CIE-Lab $L*$ from 85 to 90), and a more black colored dark state (e.g., where the dark state has an average CIE-Lab $b*$ from −5 to −2, an average CIE-Lab $a*$ from −7 to −5, and an average CIE-Lab $L*$ from 10 to 30).

In some embodiments, the seams between the EC devices in a tiled EC device are invisible, or not very noticeable, or have minimized visual appearance. In some embodiments, the minimized visual appearance of the seams means that the deltaE between any point within the seam regions and any point within the active area of the EC devices, when the EC devices are in a clear state, a dark state or a tinted state, is less than 10, or less than 5, or less than 2, or less than 1. In some embodiments, the minimized visual appearance of the seams means that the difference in Tvis between the seam regions and the active area of the EC devices, when the EC devices are in a clear state, a dark state or a tinted state, is less than 5%, or less than 2%, or less than 1%, or less than 0.1%.

In some embodiments, tiled EC devices have a low transmission dark state (e.g., with Tvis less than 5%), and a high transparency clear state (e.g., with Tvis greater than 70%), and a continuum of tinted states with varying transmission between these two end states. In some embodiments, tiled EC devices have a low transmission dark state (e.g., with Tvis less than 5%) and a high transparency clear state (e.g., with Tvis greater than 70%), and a continuum of tinted states with varying transmission between these two end states, and the dark state, the clear state and the tinted states all have colors that are close to neutral (e.g., with $a*$ from −4 to 4, and $b*$ from −6 to 6). This tiled EC device may also have very fast switching speed (e.g., less than 5 minutes, or less than 10 minutes) as well as uniform transitions between states (e.g., where the clear state, dark state and all tinted states have deltaE between any two points within the active area of the device across the area of the device less than 10) by including one or more gradient transparent conductive layers in each EC device or panel.

In some embodiments, tiled EC devices have a clear state with a CIE-Lab $L*$ in transmission from 70 to 95, $b*$ in transmission from −8 to 8, $a*$ in transmission from −4 to 4, and a Tvis from 70% to 80%. In some embodiments, tiled EC devices also have a dark state with a CIE-Lab $L*$ in transmission from 0 to 30, b* in transmission from −5 to −2, and a* in transmission from −7 to −5, and a Tvis from 0.01% to 5%. In some embodiments, tiled EC devices also have a deltaE between any two points within the active area of the device in transmission of less than 10 in the clear state, the dark state, and at all tint states, across the large area EC device in all lateral dimensions. In some embodiments, tiled EC devices also have a plurality of tint states are along a continuum of tints comprising a Tvis from 0.1% to 80%.

In some embodiments, the tiled EC devices described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0. In some embodiments, the electrochromic devices described herein have a clear state CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1. In some embodiments, the electrochromic devices described herein have a clear state CIE-Lab L* in transmission from 80 to 100, or from 85 to 100, or from 85 to 95, or from 85 to 90, or from 70 to 95, or approximately 90, or approximately 87.5, or approximately 85.

In some embodiments, the tiled EC devices described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0; and CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1; and a CIE-Lab L* in transmission from 80 to 100, or from 85 to 100, or from 85 to 95, or from 85 to 90, or from 70 to 95, or approximately 90, or approximately 87.5, or approximately 85.

In some embodiments, the tiled EC devices described herein have a clear state Tvis greater than 50%, or greater than 55%, or greater than 60%, or greater than 65%, or greater than 70%, or greater than 75%, or greater than 80%, or greater than 85%, or greater than 90%, or greater than 95%, or from 60% to 99%, or from 60% to 95%, or from 60% to 90%, or from 70% to 90%, or from 70% to 85%, or from 70% to 80%.

In some embodiments, the tiled EC devices described herein have a clear state color uniformity deltaE between any two points within the active area of the device in transmission less than 15, or less than 10, or less than 8, or less than 5, or from 0 to 15, or from 0 to 10, or from 0 to 5.

In some embodiments, the tiled EC devices described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0. In some embodiments, the electrochromic devices described herein have a dark state CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5. In some embodiments, the electrochromic devices described herein have a dark state CIE-Lab L* in transmission from 0 to 40, or from 0 to 30, or from 0 to 20, or from 10 to 30, or from 15 to 25, or approximately 10, or approximately 15, or approximately 20.

In some embodiments, the tiled EC devices described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0; and a CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5; and a CIE-Lab L* in transmission from 0 to 40, or from 0 to 30, or from 0 to 20, or from 10 to 30, or from 15 to 25, or approximately 10, or approximately 15, or approximately 20.

In some embodiments, the tiled EC devices described herein have a dark state Tvis less than 35%, or less than 30%, or less that 25%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 20%, or from 0.001% to 15%, or from 0.001% to 10%, or from 0.001% to 5%, or from 0.01% to 5%, or from 0.1% to 5%.

In some embodiments, the tiled EC devices described herein have a dark state color uniformity deltaE between any two points within the active area of the device in transmission less than 15, or less than 10, or less than 8, or less than 5, or from 0 to 15, or from 0 to 10, or from 0 to 5.

In some embodiments, the tiled EC devices described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3. In some embodiments, the electrochromic devices described herein have a tinted state CIE-Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1. In some embodiments, the electrochromic devices described herein have a tinted state CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the tiled EC devices described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3; and −Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1; and a CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the tiled EC devices described herein have a tinted state Tvis greater than 50%, or greater than 55%, or greater than 60%, or greater than 65%, or greater than 70%, or greater than 75%, or greater than 80%, or greater than 85%, or greater than 90%, or greater than 95%%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 99%, or from 0.01% to 99%, or from 0.1% to 99%, or from 10% to 90%, or from 10% to 80%, or from 10% to 70%, or from 20% to 70%, or from 50% to 70%, or from 20% to 50%, or from 40% to 60%, or from 20% to 40%, or from 60% to 70%.

In some embodiments, the tiled EC devices described herein have a tinted state color uniformity deltaE between any two points within the device active area in transmission less than 15, or less than 10, or less than 8, or less than 5, or from 0 to 15, or from 0 to 10, or from 0 to 5.

Methods of Producing Tiled Electrochromic Devices

FIG. 30 shows a method for producing a tiled EC device, in some embodiments. In some embodiments, the method for producing a tiled EC device includes, providing a carrier glass 3002, arranging a first EC device on the carrier glass 3004, and arranging a second EC device on the carrier glass 3006. In some embodiments, the first and second EC devices comprise a clear state and a dark state. In some embodiments of the above method, the first and second EC devices are laminated to the carrier glass. In some embodiments, the first and second EC devices are arranged such that the seam between the EC devices is difficult for an average observer to see, or is hidden.

In some embodiments of the above method, a subsequent step is added wherein the seam between the first and second EC device is obscured by adding a covering.

In some embodiments, an apparatus is used to keep the EC devices aligned with one another and with the carrier glass during lamination. This can be advantageous since the polymers typically used for lamination can flow when exposed the elevated temperature during lamination, which can permit the EC devices to move during lamination. In some cases, if the EC devices move during lamination the width of the seams between the EC devices in a tiled EC device can become too large. In some embodiments, the apparatus used to keep the EC devices aligned with one another and with the carrier glass during lamination is a fixed fixture, a dynamic fixture, a fixture that primarily makes contact with the edges of the EC devices and some portion of the carrier glass, or a fixture that only makes contact with the edges of the EC devices and some portion of the carrier glass. One example of an apparatus used to keep the EC devices aligned with one another and with the carrier glass during lamination is a fixture that can constrain the movement of the EC devices during lamination by primarily making contact with the edges of the EC devices and the carrier glass, such that when two pieces of carrier glass are used to sandwich the EC devices in the tiled EC device the fixture is effective. Another example of an apparatus used to keep the EC devices aligned with one another and with the carrier glass during lamination is a fixture that primarily makes contact with the edges of the EC devices and is approximately the same thickness, or is thinner than the tiled EC device so that the pressure applied to the tiled EC device during lamination (e.g., by the bladder of a laminator) remains uniform across the tiled EC device. In some embodiments, the apparatus used to keep the EC devices aligned with one another and with the carrier glass during lamination is a fixture that is removed after lamination. In some embodiments, the apparatus used to keep the EC devices aligned with one another and with the carrier glass during lamination is one or more elements (e.g., spacers, frames, posts, clips, and/or adhesive dots) that remain in the device after lamination.

What is claimed is:
1. A tiled electrochromic (EC) device, comprising:
a carrier glass;
a first EC device laminated to the carrier glass comprising a first active area, a first clear state and a first dark state;
a second EC device laminated to the carrier glass comprising a second active area, a second clear state and a second dark state;
a third active area comprising the first active area and second active areas; and
a seam between the first and second EC devices;
wherein:
the carrier glass has an area greater than 2 m$^2$;
the first and second clear states comprise a CIE-Lab L* in transmission from 70 to 95, b* in transmission from −8 to 8, and a* in transmission from −4 to 4;
the third active area comprises a third clear state, a third dark state, and a plurality of tint states between the third clear state and the third dark state, wherein the plurality of tint states are along a continuum of tints comprising a Tvis from 0.1% to 80%; and
a deltaE between any two points within the third active area of the tiled EC device in transmission is less than 10 in the third clear state, the third dark state, and at all tint states in the plurality of tint states, across the large area tiled EC device in all lateral dimensions.

2. The tiled EC device of claim 1, wherein the first and second clear states further comprise a Tvis from 70% to 80%.

3. The tiled EC device of claim 1, wherein the first and second dark states comprise a CIE-Lab L* in transmission from 0 to 30, b* in transmission from −5 to −2, a* in transmission from −7 to −5, and a Tvis from 0.01% to 5%.

4. The tiled EC device of claim 1, wherein the seam comprises a seam region, wherein a deltaE between any point within the seam region and any point within the first or second active areas is less than 10, when the first or second EC devices are in the first or second clear state, respectively, or the first or second dark state, respectively.

5. The tiled EC device of claim 1, further comprising a covering obscuring the seam, wherein the deltaE between any point within the covering and any point within the first or second active areas is less than 10, when the first or second EC devices are in the first or second dark state, respectively.

6. The tiled EC device of claim 1, wherein a width of the seam is less than 0.05 cm.

7. The tiled EC device of claim 1, further comprising:
a first set of bus bars in the first EC device; and
a second set of bus bars in the second EC device, wherein
the first and second set of bus bars are aligned with one another across the seam, and at least one of the bus bars in the first and second EC devices is located at a peripheral edge of the tiled EC device.

8. The tiled EC device of claim 1, further comprising:
a first sequestration terminal in the first EC device;
a second sequestration terminal in the second EC device;
a first sense voltage terminal in the first EC device; and
a second sense voltage terminal in the second EC device.

9. The tiled EC device of claim 8, further comprising:
a first set of bus bars in the first EC device;
a second set of bus bars in the second EC device; and
an electrical connection between the first and second EC devices comprising one or more circuit boards connecting the first and second sets of bus bars, first and second sense voltage terminals, and first and second sequestration terminals between the first EC device and the second EC device.

10. The tiled EC device of claim 9, further comprising:
an upper and a lower substrate in the first EC device;
an upper and a lower substrate in the second EC device;
the upper substrate in the first EC device is offset in a lateral direction from the lower substrate in the first EC device along at least a portion of an edge of the first EC device; and
the first bus bars, first sense voltage terminals and first sequestration terminals that are on the lower substrate of the first EC device are exposed by the upper substrate of the first EC device being offset in the lateral direction from the lower substrate of the first EC device.

11. The tiled EC device of claim 1, further comprising:
one or more first gradient electrically conductive layers in the first EC device; and
one or more second gradient electrically conductive layers in the second EC device, wherein
the gradient direction of the one or more first gradient electrically conductive layers in the first EC device is parallel to the gradient direction of the second gradient transparent conductor layers in the second EC device.

12. The tiled EC device of claim 11, further comprising:
a first visually perceptible pattern in the first EC device; and
a second visually perceptible pattern in the second EC device, wherein
the first and second visually perceptible patterns in the first and second EC devices respectively, are aligned with one another across the seam between the first and second EC devices.

13. A tiled electrochromic (EC) device, comprising:
a carrier glass;
a first EC device laminated to the carrier glass comprising a first active area, a first clear state and a first dark state;
a second EC device laminated to the carrier glass comprising a second active area, a second clear state and a second dark state; and
a seam between the first and second EC devices;
wherein:
the carrier glass has an area greater than 2 $m^2$;
the first and second clear states comprise a CIE-Lab L* in transmission from 70 to 95, b* in transmission from −8 to 8, and a* in transmission from −4 to 4; and
the seam comprises a seam region, wherein a deltaE between any point within the seam region and any point within the first or second active areas is less than 10, when the first or second EC devices are in the first or second clear state, respectively, or the first or second dark state, respectively.

14. The tiled EC device of claim 13, wherein the first and second clear states further comprise a Tvis from 70% to 80%.

15. The tiled EC device of claim 13, wherein the first and second dark states comprise a CIE-Lab L* in transmission from 0 to 30, b* in transmission from −5 to −2, a* in transmission from −7 to −5, and a Tvis from 0.01% to 5%.

16. The tiled EC device of claim 13, wherein a width of the seam is less than 0.05 cm.

17. The tiled EC device of claim 13, further comprising:
a first set of bus bars in the first EC device; and
a second set of bus bars in the second EC device, wherein
the first and second set of bus bars are aligned with one another across the seam, and at least one of the bus bars in the first and second EC devices is located at a peripheral edge of the tiled EC device.

18. The tiled EC device of claim 13, further comprising:
one or more first gradient electrically conductive layers in the first EC device; and
one or more second gradient electrically conductive layers in the second EC device, wherein
the gradient direction of the one or more first gradient electrically conductive layers in the first EC device is parallel to the gradient direction of the second gradient transparent conductor layers in the second EC device.

19. The tiled EC device of claim 18, further comprising:
a first visually perceptible pattern in the first EC device; and
a second visually perceptible pattern in the second EC device, wherein
the first and second visually perceptible patterns in the first and second EC devices, respectively, are aligned with one another across the seam between the first and second EC devices.

* * * * *